US012374928B2

United States Patent
Elshafie et al.

(10) Patent No.: US 12,374,928 B2
(45) Date of Patent: *Jul. 29, 2025

(54) SIGNALING FOR ENERGY HARVESTING AT A DEVICE

(71) Applicant: QUALCOMM Incorporated, San Diego, CA (US)

(72) Inventors: Ahmed Elshafie, San Diego, CA (US); Sony Akkarakaran, Poway, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,719

(22) Filed: May 29, 2024

(65) Prior Publication Data

US 2024/0421638 A1    Dec. 19, 2024

Related U.S. Application Data

(63) Continuation of application No. 17/331,557, filed on May 26, 2021, now Pat. No. 12,040,630.

(51) Int. Cl.
*H02J 50/20* (2016.01)
*H04W 4/20* (2018.01)
*H04W 8/24* (2009.01)

(52) U.S. Cl.
CPC ............... *H02J 50/20* (2016.02); *H04W 4/20* (2013.01); *H04W 8/24* (2013.01)

(58) Field of Classification Search
CPC .......... H02J 50/20; H02J 50/80; H02J 50/001; H02J 7/00034; H02J 50/10; H02J 50/70;
(Continued)

(56) References Cited

U.S. PATENT DOCUMENTS

| 11,990,762 B2 | 5/2024 | Elshafie et al. |
| 12,040,630 B2 | 7/2024 | Elshafie et al. |
| 2012/0213261 A1 | 8/2012 | Sayana et al. |
| 2018/0085593 A1* | 3/2018 | Fayram ............... A61N 1/0551 |

(Continued)

FOREIGN PATENT DOCUMENTS

| EP | 2930873 A1 | 10/2015 |
| WO | WO-2020236665 A1 | 11/2020 |

OTHER PUBLICATIONS

Gautam S., et al., "Wireless Multi-group Multicast Precoding with Selective RF Energy Harvesting", 2019 27th European Signal Processing Conference (EUSIPCO), EURASIP, Sep. 2, 2019, pp. 1-5, XP033660182, Section IV.

(Continued)

*Primary Examiner* — Lincoln D Donovan
*Assistant Examiner* — Tyler J Pereny
(74) *Attorney, Agent, or Firm* — Holland & Hart LLP/QUALCOMM Incorporated

(57) ABSTRACT

Methods, systems, and devices for wireless communications are described that support signaling for energy harvesting at a first device. In some examples, the first device may transmit, to a second device, an indication of one or more an energy conversion efficiency factors, power threshold parameters, power levels, battery power levels, or the like. Based on receiving the indication of the one or more of the characteristics, the second device may determine a radio frequency power for subsequent signaling. The second device may transmit a signal having the determined radio frequency power, and the first device may receive the signaling and convert at least a first portion of the radio frequency power to direct current (DC) power.

18 Claims, 17 Drawing Sheets

(58) Field of Classification Search
CPC .. H02J 7/00; H02J 50/40; H02J 50/402; H02J 7/34; H04B 5/79; H04B 1/3883; H04B 1/40; H04B 17/102; H04B 17/23; H04B 17/318; H04B 5/77; H04W 52/288; H04W 52/245; H04W 52/28; H04W 52/283; H04W 72/0446; H04W 72/20; H04W 76/28; H04W 4/70; H04W 52/367; H04W 72/23; H04W 72/27

See application file for complete search history.

(56) References Cited

U.S. PATENT DOCUMENTS

| | | | |
|---|---|---|---|
| 2020/0106308 | A1 | 4/2020 | Kim et al. |
| 2020/0169122 | A1 | 5/2020 | Prakriya et al. |
| 2020/0359375 | A1 | 11/2020 | Hwang et al. |
| 2021/0067991 | A1* | 3/2021 | Zhu .................. H04L 5/0051 |
| 2021/0119726 | A1 | 4/2021 | Kim et al. |
| 2021/0126488 | A1 | 4/2021 | Kim et al. |
| 2022/0070836 | A1 | 3/2022 | Balasubramanian et al. |
| 2022/0225402 | A1 | 7/2022 | Elkotby et al. |
| 2022/0248432 | A1 | 8/2022 | Balasubramanian et al. |
| 2022/0385104 | A1 | 12/2022 | Elshafie et al. |
| 2022/0385109 | A1 | 12/2022 | Elshafie et al. |
| 2024/0266872 | A1 | 8/2024 | Elshafie et al. |

OTHER PUBLICATIONS

Hu L., et al., "Dynamic Power Splitting Policies for AF Relay Networks with Wireless Energy Harvesting", arxiv.org, Cornell University Library, 201 Olin Library Cornell University Ithaca, NY 14853, Mar. 23, 2015, 5 Pages, XP081332930, Sections I and II.

International Preliminary Report in Patentability—PCT/US2022/027401—The International Bureau of WIPO—Geneva, Switzerland—Dec. 7, 2023.

International Preliminary Report on Patentability—PCT/US2022/027420—The International Bureau of WIPO—Geneva, Switzerland—Dec. 7, 2023.

International Search Report and Written Opinion—PCT/US2022/027401—ISA/EPO—Nov. 15, 2022.

International Search Report and Written Opinion—PCT/US2022/027420—ISA/EPO—Aug. 11, 2022.

Kang J-M., et al., "Dynamic Power Splitting for SWIPT With Nonlinear Energy Harvesting in Ergodic Fading Channel", IEEE Internet of Things Journal, IEEE, USA, vol. 7, No. 6, Mar. 11, 2020, pp. 5648-5665, XP011793078, DOI: 10.1109/JIOT.2020.2980328 [retrieved on Jun. 12, 2020] p. 5651.

Partial International Search Report—PCT/US2022/027401—ISA/EPO—Aug. 26, 2022.

Wang F., et al., "Relay and Power Splitting Ratio Selection for Cooperative Networks with Energy Harvesting" 2015 IEEE 21st International Conference on Parallel and Distributed Systems (ICPADS), IEEE, Dec. 14, 2015, pp. 52-59, 8 Pages, XP032850816, Section II.A.

Wang F., et al., "Relay Selection and Power Allocation for Cooperative Communication Networks With Energy Harvesting", IEEE Systems Journal, IEEE, US, vol. 12, No. 1, Mar. 1, 2018, pp. 735-746, XP011679977, ISSN: 1932-8184, DOI: 10.1109/JSYST.2016.2524634 [retrieved on Mar. 23, 2018] pp. 736, 737 p. 738, left-hand column, Section IV. A, p. 741.

* cited by examiner

SIGNALING FOR ENERGY HARVESTING AT A DEVICE

CROSS-REFERENCE TO RELATED APPLICATION

This application for patent is a continuation of U.S. Non-Provisional application Ser. No. 17/331,557, filed on May 26, 2021, entitled "SIGNALING FOR ENERGY HARVESTING AT A DEVICE," which is hereby expressly incorporated by reference herein.

INTRODUCTION

The following relates to wireless communications, and more specifically to managing signals at a device.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first device is described. The method may include transmitting, to a second device, an indication of an energy conversion efficiency factor and a threshold power parameter, The method may further include receiving, from the second device, a signal including a radio frequency power, where the radio frequency power is based on the transmitted indication, and converting at least a first portion of the radio frequency power of the signal to direct current (DC) power.

An apparatus for wireless communication at a first device is described. The apparatus may include a processor, memory coupled to the processor, the processor and memory configured to transmit, to a second device, an indication of an energy conversion efficiency factor and a threshold power parameter, The processor and memory may be configured further to receive, from the second device, a signal including a radio frequency power, where the radio frequency power is based on the transmitted indication, and convert at least a first portion of the radio frequency power of the signal to DC power.

Another apparatus for wireless communication at a first device is described. The apparatus may include means for transmitting, to a second device, an indication of an energy conversion efficiency factor and a threshold power parameter, The apparatus may further include means for receiving, from the second device, a signal including a radio frequency power, where the radio frequency power is based on the transmitted indication, and means for converting at least a first portion of the radio frequency power of the signal to DC power.

A non-transitory computer-readable medium storing code for wireless communication at a first device is described. The code may include instructions executable by a processor to transmit, to a second device, an indication of an energy conversion efficiency factor and a threshold power parameter, The code may further include instructions executable by the processor to receive, from the second device, a signal including a radio frequency power, where the radio frequency power is based on the transmitted indication, and convert at least a first portion of the radio frequency power of the signal to DC power.

Some examples of the method, apparatuses, and non-transitory computer-readable medium described herein may further include operations, features, means, or instructions for transmitting, to the second device, a second indication of one or more additional energy conversion efficiency factors.

Some examples of the method, apparatuses, and non-transitory computer-readable medium described herein may further include operations, features, means, or instructions for determining, by the first device, a model associated with an efficiency of energy harvesting, where the energy conversion efficiency factor and the one or more additional energy conversion efficiency factors may be based on the model.

Some examples of the method, apparatuses, and non-transitory computer-readable medium described herein may further include operations, features, means, or instructions for transmitting, to the second device, a second indication of a target amount of converted DC power, where the radio frequency power of the received signal may be further based on the target amount of converted DC power.

Some examples of the method, apparatuses, and non-transitory computer-readable medium described herein may further include operations, features, means, or instructions for transmitting the second indication via a media access control (MAC) control element (CE), a transmission via a physical uplink channel, or a combination thereof.

Some examples of the method, apparatuses, and non-transitory computer-readable medium described herein may further include operations, features, means, or instructions for transmitting the indication via radio resource control (RRC) signaling, a MAC-CE, control information, or a combination thereof.

Some examples of the method, apparatuses, and non-transitory computer-readable medium described herein may further include operations, features, means, or instructions for storing the DC power at the first device based on the converting.

Some examples of the method, apparatuses, and non-transitory computer-readable medium described herein may further include operations, features, means, or instructions for decoding the signal based on a second portion of the radio frequency power of the signal.

A method for wireless communication at a first device is described. The method may include transmitting, to a second device, an indication of a set of power levels including a first quantity of input radio frequency power levels and a second quantity of output DC power levels. The method may further include receiving, from the second device, a signal having a radio frequency power that is based on the transmitted indication, and converting at least a first portion of the radio frequency power of the signal to DC power.

An apparatus for wireless communication at a first device is described. The apparatus may include a processor, memory coupled to the processor, the processor and memory configured to transmit, to a second device, an indication of a set of power levels including a first quantity of input radio frequency power levels and a second quantity of output DC power levels, The processor and memory may further be configured to receive, from the second device, a signal having a radio frequency power that is based on the transmitted indication, and convert at least a first portion of the radio frequency power of the signal to DC power.

Another apparatus for wireless communication at a first device is described. The apparatus may include means for transmitting, to a second device, an indication of a set of power levels including a first quantity of input radio frequency power levels and a second quantity of output DC power levels. The apparatus may further include means for receiving, from the second device, a signal having a radio frequency power that is based on the transmitted indication, and means for converting at least a first portion of the radio frequency power of the signal to DC power.

A non-transitory computer-readable medium storing code for wireless communication at a first device is described. The code may include instructions executable by a processor to transmit, to a second device, an indication of a set of power levels including a first quantity of input radio frequency power levels and a second quantity of output DC power levels. The code may further include instructions executable by the processor to receive, from the second device, a signal having a radio frequency power that is based on the transmitted indication, and convert at least a first portion of the radio frequency power of the signal to DC power.

Some examples of the method, apparatuses, and non-transitory computer-readable medium described herein may further include operations, features, means, or instructions for transmitting a mapping between the first quantity of input radio frequency power levels and the second quantity of output DC power levels.

Some examples of the method, apparatuses, and non-transitory computer-readable medium described herein may further include operations, features, means, or instructions for determining, for each of the first quantity of input radio frequency power levels, a corresponding one of the second quantity of output DC power levels, where transmitting the indication may be based on the determining.

Some examples of the method, apparatuses, and non-transitory computer-readable medium described herein may further include operations, features, means, or instructions for transmitting, to the second device, a second indication of a target amount of converted DC power, where the radio frequency power of the received signal may be based on the target amount of converted DC power.

Some examples of the method, apparatuses, and non-transitory computer-readable medium described herein may further include operations, features, means, or instructions for transmitting the second indication via a MAC-CE, a transmission via a physical uplink channel, or a combination thereof.

Some examples of the method, apparatuses, and non-transitory computer-readable medium described herein may further include operations, features, means, or instructions for transmitting the indication via RRC signaling, a MAC-CE, control information, or a combination thereof.

Some examples of the method, apparatuses, and non-transitory computer-readable medium described herein may further include operations, features, means, or instructions for storing the DC power at the first device based on the converting.

Some examples of the method, apparatuses, and non-transitory computer-readable medium described herein may further include operations, features, means, or instructions for decoding the signal based on a second portion of the radio frequency power of the signal.

A method for wireless communication at a first device is described. The method may include transmitting, to a second device, a first indication of a first power level of a battery of the first device, receiving, from the second device, a signal including a radio frequency power, where the radio frequency power is based on the transmitted first indication. The method may further include storing at least a first portion of the radio frequency power of the signal as DC power at the first device, and transmitting, based on the storing, a second indication of a second power level of the battery to the second device.

An apparatus for wireless communication at a first device is described. The apparatus may include a processor, memory coupled to the processor, the processor and memory configured to transmit, to a second device, a first indication of a first power level of a battery of the first device, receive, from the second device, a signal including a radio frequency power, where the radio frequency power is based on the transmitted first indication. The processor and memory may further be configured to store at least a first portion of the radio frequency power of the signal as DC power at the first device, and transmit, based on the storing, a second indication of a second power level of the battery to the second device.

Another apparatus for wireless communication at a first device is described. The apparatus may include means for transmitting, to a second device, a first indication of a first power level of a battery of the first device, means for receiving, from the second device, a signal including a radio frequency power, where the radio frequency power is based on the transmitted first indication. The apparatus may further include means for storing at least a first portion of the radio frequency power of the signal as DC power at the first device, and means for transmitting, based on the storing, a second indication of a second power level of the battery to the second device.

A non-transitory computer-readable medium storing code for wireless communication at a first device is described. The code may include instructions executable by a processor to transmit, to a second device, a first indication of a first power level of a battery of the first device, receive, from the second device, a signal including a radio frequency power, where the radio frequency power is based on the transmitted first indication. The code may further include instructions executable by the processor to store at least a first portion of the radio frequency power of the signal as DC power at the first device, and transmit, based on the storing, a second indication of a second power level of the battery to the second device.

Some examples of the method, apparatuses, and non-transitory computer-readable medium described herein may further include operations, features, means, or instructions for receiving, from the second device, a request for the second indication of the second power level of the battery, where transmitting the second indication may be based on receiving the request for the second indication from the second device.

Some examples of the method, apparatuses, and non-transitory computer-readable medium described herein may further include operations, features, means, or instructions for transmitting, to the second device, a third indication of a type of the battery of the first device, where receiving the signal may be based on transmitting the third indication of the type of the battery of the first device.

Some examples of the method, apparatuses, and non-transitory computer-readable medium described herein may further include operations, features, means, or instructions for transmitting, to the second device, a third indication of a target amount of converted DC power, where the radio frequency power of the received signal may be based on the target amount of converted DC power.

Some examples of the method, apparatuses, and non-transitory computer-readable medium described herein may further include operations, features, means, or instructions for transmitting the second indication via a MAC-CE, a transmission via a physical uplink channel, or a combination thereof.

Some examples of the method, apparatuses, and non-transitory computer-readable medium described herein may further include operations, features, means, or instructions for receiving, from the second device, a second signal including a second radio frequency power that may be based on the second power level of the battery, where receiving the second signal may be based on transmitting the second indication.

Some examples of the method, apparatuses, and non-transitory computer-readable medium described herein may further include operations, features, means, or instructions for converting at least the first portion of the radio frequency power of the signal to the DC power, where the storing may be based on the converting.

DETAILED DESCRIPTION

Figure 1:
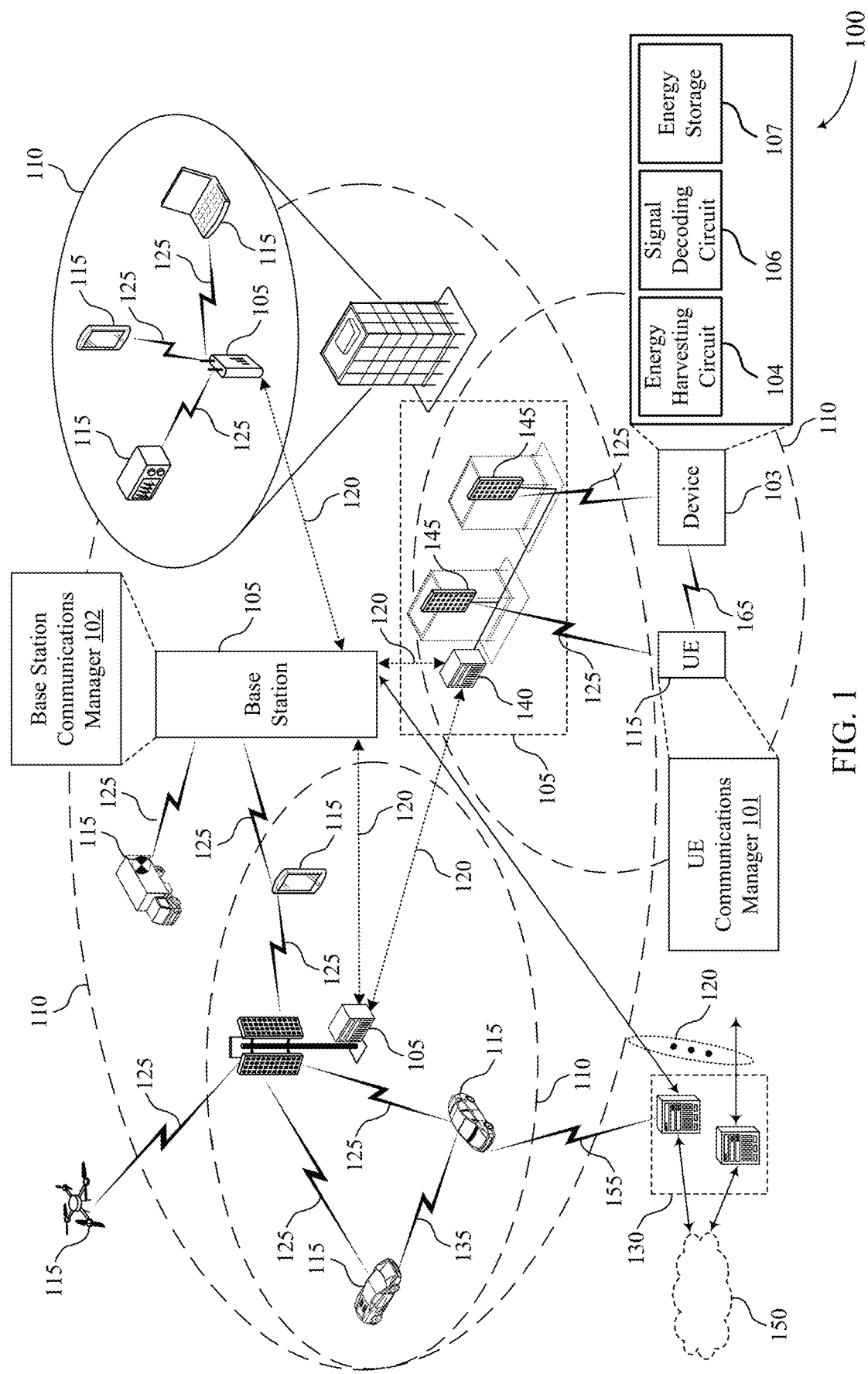
FIG. 1 illustrates an example of a wireless communications system that supports signaling for energy harvesting at a device in accordance with one or more aspects of the present disclosure.

In some cases, wireless communication systems may support techniques for radio frequency energy harvesting. For example, a wireless communications system may include various devices, such as a UE, a base station, a wearable device, or other devices. In some cases, a first device (e.g., a UE, a base station, any sidelink enabled device) may be configured to perform energy harvesting by converting received radio frequency power associated with wireless signals received from a second device (e.g., a UE, a base station, any sidelink enabled device) to DC power. In some examples, the first device may be configured to convert received radio frequency power to DC power and store the converted DC power at the first device. For example, the second device may transmit signals with a determined radio frequency power to the first device. The first device may include a signal decoding circuit to receive and decode signals from the second device as well as an energy harvesting circuit to convert radio frequency power to DC power. In some examples, the energy harvesting circuit may perform (e.g., take inputs and produce outputs) according to one or more characteristics (e.g., a threshold power parameter, an energy conversion efficiency factor, power levels, or the like).

In some examples, the first device may transmit signaling indicating one or more parameters associated with the energy harvesting to the second device. Based on receiving the signaling indicating the one or more parameters, the second device may adjust a radio frequency power of signals transmitted to the first wireless device. For example, the second device may adjust the radio frequency power of signals transmitted to the first wireless device to increase an efficiency of the energy harvesting performed by the first device.

In some wireless communications systems, the first device may transmit, to a second device, an indication of energy conversion efficiency factors, power threshold parameters, power levels, or a combination thereof. For example, the first device may transmit an indication of the energy conversion efficiency factor, a threshold power parameter, or both, to the second device. The energy conversion efficiency factor may represent an efficiency of the energy harvesting circuit to convert radio frequency power to DC power. For example, an energy conversion efficiency factor of 50% may represent that the first device may convert 50% of radio frequency power input to the energy harvesting circuit to DC power output from the energy harvesting circuit. Additionally, the threshold power parameter may represent a maximum radio frequency power that the energy harvesting circuit may convert to DC power. For example, the energy harvesting circuit may convert a portion of radio frequency power input into the energy harvesting circuit to DC power (e.g., where the portion corresponds to the energy conversion efficiency power) until the input radio frequency power reaches the threshold power parameter. That is, the energy harvesting circuit may output a same quantity of DC power in response to the maximum radio frequency power being input and more than the maximum radio frequency power being input to the energy harvesting circuit. Based on receiving the indication from the first device, the second device may determine a radio frequency power for subsequent signaling to the first device, according to the indication. For example, the second device may adjust the radio frequency power of subsequent signals to increase a power efficiency associated with the energy harvesting circuit at the first device and maintain a certain quality of service (QoS). That is, the second device may avoid transmitting signals having more radio frequency power than the first device has the capability to convert to DC power (e.g., based on the threshold power parameter associated with the energy harvesting circuit). Additionally, the second device may attempt to transmit signals having sufficient radio frequency power to ensure that a radio frequency power of signals received by the signal decoding circuit of the first device are associated with a desired QoS.

Utilizing the techniques as described herein may enable the second device to transmit signals having a radio frequency power that is based on parameters associated with the energy harvesting at the first device. In some cases, the second device transmitting signals based on the determined radio frequency power (e.g., that is based on the parameters associated with the energy harvesting at the second device) may result in power savings at the first device and the second device and an extended battery life at the first device. Additionally, configuring the second device to transmit signals based on the determined radio frequency power may result in more reliable communications between the first device and the second devices (e.g., when compared to communications where the second device does not transmit signals to the first device having a radio frequency power that is based on the parameters associated with the energy harvesting at the first device) That is, the second device may adjust the radio frequency power based on the parameters to increase a probability of achieving a desired QoS.

Aspects of the disclosure are initially described in the context of systems and process flows. Aspects of the disclosure are then described in the context of energy harvesting schemes and circuitry. Aspects of the disclosure are further illustrated by and described with reference to apparatus diagrams, system diagrams, and flowcharts that relate to signaling for energy harvesting at a device.

FIG. 1 illustrates an example of a wireless communications system 100 that supports signaling for energy harvesting at a device in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, as opposed to transmission and reception simultaneously). In some examples, half-duplex communications may be performed at a reduced peak rate. Other power conservation techniques for the UEs 115 include entering a power saving deep sleep mode when unengaged in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some cases, a communication link 135 may be referred to as a sidelink communication link and may be used for sidelink communications between UEs 115. In some cases, a sidelink communication link as described herein may additionally or alternatively represent an example of a relay link 165, where the relay link 165 may be used to relay information (e.g., data, control information) from a first UE 115 to a second UE 115. In some cases, the relay link 165 may additionally or alternatively be an example of a communication link 135. In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in some cases, in the range of 300 megahertz (MHz) to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support various techniques for energy harvesting. Energy harvesting may include acquiring energy from an energy source (e.g., a radio frequency wave, a conducting wire) and using or storing the acquired energy for any task that may correspond to, or otherwise be associated with, energy harvesting. In some examples, wireless communications system 100 may include a device 103 that is configured to perform energy harvesting. That is, the device 103 may include an energy harvesting circuit 104 that has the capability of converting received radio frequency power to DC power. In some cases, the device 103 may then store the DC power (e.g., converted by the energy harvesting circuit 104 from radio frequency power) at an energy storage 107 (e.g., a battery) of the device 103. In some cases, the device 103 may be configured to both harvest radio frequency energy (e.g., using the energy harvesting circuit 104) and decode radio frequency transmissions (e.g., using a signal decoding circuit 106). Additionally, radio frequency sources (e.g., radio frequency transmissions) may provide controllable and relatively constant energy transfer over distances, where the energy harvested may be predictable and relatively stable over time.

In some examples, the device 103 may transmit an indication, to a radio frequency source (e.g., a UE 115, a base station 105, any sidelink enabled device), of one or more characteristics (e.g., a threshold power parameter, an energy conversion efficiency factor, power levels, or the like) of the energy harvesting circuit 106. Based on receiving the indication of the one or more of the characteristics of the energy harvesting circuit 106 from the device 103, the radio frequency source may determine a radio frequency power for subsequent signaling according to the indicated characteristics. In some examples, the radio frequency source may avoid transmitting signals having more radio frequency power than the device 103 has the capability of converting to DC power (e.g., based on a threshold power parameter associated with the energy harvesting circuit 104). Additionally, the radio frequency source may attempt to transmit signals having sufficient radio frequency power to ensure that a radio frequency power of signals received by the signal decoding circuit 106 of the device 103 are associated with a desired QoS. Thus, the radio frequency source may transmit signals based on the determined radio frequency power which may result in power savings, extended battery life, and reliable communications.

In some examples, the device 103 may be an example of a base station 105 where one or more of the operations of the device 103 may be performed by a base station communications manager 102, which may be an example of a communications manager 820, 920, 1020, or 1120 as described with reference to FIGS. 8 through 11. In some cases, a transceiver may perform receiving or transmitting operations and a processor may determine one or more radio frequency powers.

In some examples, the device 103 may be an example of a UE 115 where one or more of the operations of the device 103 may be performed by a UE communications manager 101, which may be an example of a communications manager 820, 920, 1020, or 1120 as described with reference to FIGS. 8 through 11. In some cases, a transceiver may perform the receiving or transmitting operations and a processor may perform administrative tasks such as preparing indications, decoding data, storing converted radio frequency power, or any other task at the UE 115.

Figure 2:
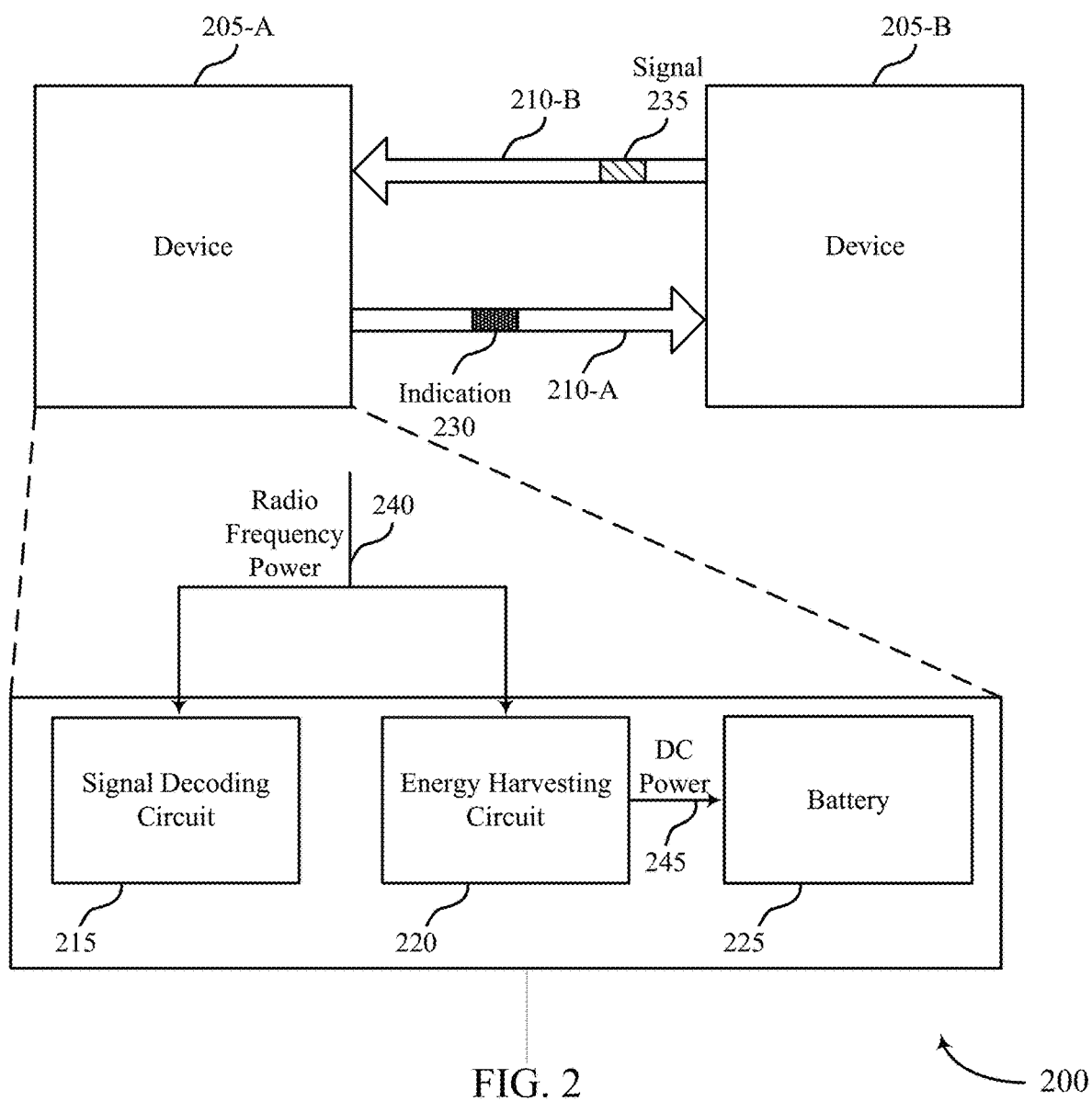
FIG. 2 illustrates an example of a system that supports signaling for energy harvesting at a device in accordance with one or more aspects of the present disclosure.

FIG. 2 illustrates an example of a system 200 that supports signaling for energy harvesting at a device 205 in accordance with one or more aspects of the present disclosure. In some examples, system 200 may implement aspects of system 100. For example, system 200 may include device 205-*a* and device 205-*b*, which may be examples of a device 103, a UE 115, a base station 105, a sidelink enabled device, or any other device as described with reference to FIG. 1.

In some cases, system 200 may support methods for radio frequency energy harvesting. That is, system 200 may include devices 205 configured to convert received radio frequency power 240 to DC power 245 and store the converted DC power 245 (e.g., at a battery 225, such as energy storage 107 as described with reference to FIG. 1, of the device 205). In some instances, a device 205 may rely on radio frequency energy harvesting to provide a controllable and constant energy transfer over a distance to one or more other devices 205. For example, device 205-*b* may transmit signals 235 with a determined radio frequency power 240 to device 205-*a*. Here, device 205-*a* may include a signal decoding circuit 215, such as signal decoding circuit 106 as described with reference to FIG. 1, to receive and decode the signal 235 from device 205-*b*. Additionally, device 205-*a* may include an energy harvesting circuit 220, such as energy harvesting circuit 104 as described with reference to FIG. 1, to convert at least a portion of the radio frequency power 240 of the signal 235 to DC power 245. For example, the energy harvesting circuit 220 may convert energy from an electromagnetic domain to an electrical domain. For example, the energy harvesting circuit 220 may receive the radio frequency power 240 (e.g., having power associated with an electromagnetic field) and may convert the radio frequency power 240 to DC power 245 (e.g., having power associated with a voltage and current). As such, device 205-*a* may convert at least a portion of the received radio frequency power 240 to DC power 245 and store the converted DC power 245 at device 205-*a* (e.g., within the battery 225). In some cases, device 205-*a* may use the stored energy to perform low energy tasks including tasks associated with information transfer such as decoding or encoding data, analog-to-digital signal conversion, processing reference signals, transmitting reference signals, operations while in an idle or otherwise inactive state, or other tasks that are associated with relatively low energy consumption (e.g., when compared to other tasks performed by device 205-*a* that consume more energy).

The energy harvested by device 205-*a* may depend on a number of factors. In some cases, a device 205 may predict an amount of energy obtained when harvesting energy according to an energy harvesting model (e.g., that considers one or more of the number of factors). As an illustrative example, device 205-*a* may predict the amount of energy obtained when harvesting energy using the energy harvesting model illustrated by Equation 1:

$$E_j = \eta P_i |g_{i-j}|^2 T \qquad (1)$$

In Equation 1, $\eta$ may be an energy conversion efficiency factor (e.g., a radio frequency-to-DC conversion efficiency) and may be a characteristic of the energy harvesting circuit 220. Further, $P_i$ may be a radio frequency power 240 of a signal 235 transmitted from a transmitting node (e.g., device 205-*b*). Additionally, $g_{i-j}$ may be a channel attenuation factor (e.g., representing path fading) that may depend on channel conditions such as channel quality, interference, or the like between the transmitting node and a receiving node (e.g., device 305-*a*). Additionally, T may be a time allocated for energy harvesting at device 205-*a*. Combined, these factors may result in $E_j$, an amount of energy harvested at device 205-*a*.

Equation 1 may be an example of a linear energy harvesting model. For instance, the amount of energy harvested at device 205-*a* may increase linearly with an increase in the radio frequency power 240. The slope of Equation 1 may correspond to the energy conversion efficiency factor (e.g., given a constant channel attenuation factor and time allocated for energy harvesting).

In some cases, a device 205 may predict an amount of energy obtained when harvesting energy according to a non-linear energy harvesting model (e.g., that considers one or more of the number of factors). For example, device 205-*a* may predict the amount of energy obtained when harvesting energy using the energy harvesting model that is based on a threshold power $P_{th}$ associated with the energy harvesting circuit 220. The threshold power $P_{th}$ may correspond to a radio frequency power level where a characteristic of the energy harvesting circuit 220 changes. For example, up until the radio frequency power level corresponding to the threshold power $P_{th}$, the amount of energy output by the energy harvesting circuit 220 may increase linearly as the input radio frequency power 240 increases. Additionally, beyond the radio frequency power level corresponding to the threshold power $P_{th}$, an increase in the radio frequency power 240 input into the energy harvesting circuit 220 may result in little (or no) change to the DC power 245 output from the energy harvesting circuit 220.

In one example, device 205-*a* may predict the amount of energy obtained when harvesting energy using the energy harvesting model illustrated by Equation 2, where the energy $E_j$ harvested by device 205-*a* is based on the threshold power $P_{th}$ of the energy harvesting circuit 220. That is, device 205-*a* may utilize a piecewise energy harvesting model based on whether the radio frequency power 240 being input to the energy harvesting circuit 220 is less than the threshold power $P_{th}$ of the energy harvesting circuit 220 or greater than the threshold power $P_{th}$ of the energy harvesting circuit 220.

$$\begin{cases} E_j = \eta P_i |g_{i-j}|^2 T, & P_i |g_{i-j}|^2 < P_{th}, \\ E_j = \eta P_{th} T, & P_i |g_{i-j}|^2 \geq P_{th}. \end{cases} \quad (2)$$

In Equation 2, when radio frequency power 240 being input to the energy harvesting circuit 220 is less than the threshold power $P_{th}$ of the energy harvesting circuit 220, device 205-*a* may predict the amount of energy obtained using a linear model, for example, according to the model represented by Equation 1. When radio frequency power 240 being input to the energy harvesting circuit 220 is greater than the threshold power $P_{th}$ of the energy harvesting circuit 220, device 205-*a* may predict the amount of energy obtained as substantially unchanging. That is, for increasing radio frequency power 240 being input to the energy harvesting circuit greater than the threshold power $P_{th}$, the amount of energy obtained may stay the same. In the case of Equation 2, the amount of energy obtained may be equal to the combination of η: the energy conversion efficiency factor (e.g., a radio frequency-to-DC conversion efficiency), T: the time allocated for energy harvesting at device 205-*a*, and the threshold power $P_{th}$.

In some other cases, device 205-*a* may predict the amount of energy obtained when harvesting energy according to a different non-linear energy harvesting model. For example, device 205-*a* may predict the amount of energy obtained when harvesting energy using the energy harvesting model illustrated by Equation 3, where the energy $E_j$ harvested by device 205-*a* is based on a polynomial energy harvesting model. The polynomial energy harvesting model may be an example of a K-coefficient polynomial model (e.g., where K corresponds to a quantity of coefficients in the polynomial model), where the relationship between input power to the energy harvesting circuit and the amount of energy harvested by device 205-*a* may be represented by a finite power series. As an illustrative example, the polynomial may represent the relationship between input power to the energy harvesting circuit and the amount of energy harvested by device 305-*a* with Equation 3:

$$\begin{cases} P_{out} = \eta_1(L)P_{in} + \eta_2(L)P_{in}^2 + \ldots + \eta_K(L)P_{in}^K, & P_{in} \leq P_{th}(L) \\ P_{out} = \eta_{th}(L)P_{th}(L), & P_{in} > P_{th}(L) \end{cases} \quad (3)$$

In Equation 3, $\eta_K$ may be the Kth coefficient of the polynomial and may be inherent to the circuit. In other words, $\eta_K$ may depend on one or more circuit characteristics (e.g., diodes, inductors, or other components) and may be associated with energy conversion efficiency. $P_{in}$ may be the power input to the energy harvesting circuit and may be less than $P_{th}$ may be, a threshold power associated with the energy harvesting circuit. $P_{out}$ may be the energy harvested by device 305-*a* and may equal the minimum of the K-coefficient polynomial and the combination of the threshold power and the energy conversion efficiency threshold $\eta_{th}$.

In some examples, the polynomial energy harvesting model may have a quantity of regions each associated with a unique behavior of the energy harvesting circuitry (e.g., the parameters in the polynomial may vary from region to region). In the example of Equation 3, $\eta_K(L)$ may be dependent on a region (L) of the energy harvesting model. That is the energy conversion efficiency factors for a first range of $P_{in}$ may differ from the energy conversion efficiency factors for a second range of $P_{in}$. For example, the power output from the energy harvesting circuit may be represented by a polynomial energy harvesting model including three regions (e.g., L=3). As such, $\eta_K(1)$ may be different from $\eta_K(2)$, $\eta_K(2)$ may be different from $\eta_K(3)$, and so on, for any value of K. Likewise, $P_{th}(L)$ may be dependent on a region (L) of the energy harvesting model. That is, each range of power input to the energy harvesting circuit may correspond to a different threshold power. Each threshold power may be associated with a regional energy conversion efficiency factor $\eta_{th}(L)$, where $\eta_{th}(L)$ may represent the energy conversion efficiency for a particular region (L).

By way of example, in a first region, the power input to the energy harvesting circuit may be less than the combination of the threshold power and the regional energy conversion efficiency factor for the first region (e.g., $P_{th}(1)$, $\eta_{th}(1)$). As such, the power output from the energy harvesting circuit may be represented by the polynomial for the first region (e.g., $\eta_K(1)$). If the power input to the energy harvesting circuit is more than the combination of the threshold power and the regional efficiency factor for the first region, the power output from the energy harvesting circuit maybe represented by the combination of the threshold power and the regional efficiency factor for the first region. In some examples, the power input to the energy harvesting circuit may surpass a regional threshold. That is, the power input to the energy harvesting circuit may increase from a value in a power range associated with the first region to a value in a power range associated with a second region. As such, the power output from the energy harvesting circuit may be represented by the polynomial model with parameters shifted accordingly (e.g., $\eta_K(2)$, $P_{th}(2)$, $\eta_{th}(2)$).

Additionally or alternatively, the regions of the polynomial energy harvesting model may be represented with one or more defining points of the model (e.g., the curve). In some examples, the polynomial energy harvesting model may be defined based on a regional curve start point (e.g., $P_{Start}(L)$), a saturation portion start point (e.g., $P_{th\ LOW}(L)$), and a saturation portion end point (e.g., $P_{th\ HIGH}(L)$). For example, the energy harvesting model may be a piecewise linear energy harvesting model. In such a case, the energy harvesting model may have a single region (e.g., L=1). $P_{Start}(1)$ may be (or may be substantially near) zero, $P_{th\ LOW}(1)$ may be located at $P_{th}(1)$. That is, $P_{th\ LOW}(1)$ may be located at the regional saturation point. $P_{th\ HIGH}(1)$) may be located at the end of the region, which in the case of a piecewise linear energy harvesting model, may be infinity. In some examples, this definition scheme may be used for a polynomial energy harvesting model. Starting from the first region (e.g., L=1), for example, $P_{Start}(1)$ may be (or may be substantially near) zero, $P_{th\ LOW}(1)$ may be located at $P_{th}(1)$, and $P_{th\ HIGH}(1)$) may be located at the end of the region, which in the case of a polynomial linear energy harvesting model, may be located at $P_{Start}(2)$. That is, the end point for a region may be (or may be substantially equal to) the start point for the next region. In some cases, the end point for a region in the polynomial energy harvesting model may be equal to infinity. For example, the polynomial energy harvesting model may have three regions. That is, there may be no region (e.g., according to the description herein) following the third region. As such, $P_{th\ HIGH}(3)$ may be equal to infinity.

In some cases, device 205-*b* may be unaware of one or more characteristics of the energy harvesting circuit 220. That is, device 205-*b* may be unaware of a threshold power parameter, an energy conversion factor, or other characteristics of the energy harvesting circuit 220. In cases where device 205-*b* is unaware of one or more of the characteristics of the energy harvesting circuit 220 of another device 205, the device 205-*b* may additionally be unaware of potential inefficiencies when transmitting signals 235 to the other device 205. For example, device 205-*b* may transmit, to device 205-*a*, a signal 235 having a radio frequency power 240 such that the radio frequency power 240 input into the energy harvesting circuit 220 exceeds the threshold power of the energy harvesting circuit 220. Here, device 205-*b* may use more transmission resources than necessary which may result in inefficient communications, excessive power loss, and the like. In another example, device 205-*b* may transmit, to device 205-*a*, a signal 235 having a radio frequency power 240 such that the radio frequency power 240 input to the signal decoding circuit 215 results in a decreased QoS. That is, the radio frequency power 240 of the signal 235 input to the signal decoding circuit 215 may be too low to enable the signal decoding circuit 215 to successfully decode the signal 235.

In the example of wireless communications system 200, a device 205-*a* that performs energy harvesting may transmit, to device 205-*b*, an indication 230 of one or more characteristics of an energy harvesting circuit 220. That is, the device 205-*a* may transmit the indication 230 of one or more characteristics of the energy harvesting circuit 220 based on an energy harvesting model associated with the energy harvesting circuit 220. In some cases, the indication 230 may include an indication of parameters associated with the energy harvesting circuit 220 (e.g., corresponding to an energy harvesting model). Additionally or alternatively, the indication 230 may include an indication of a performance of the energy harvesting circuit 220 (e.g., based on various input radio frequency power levels). In either case, transmitting the indication 230 to the device 205-*b* may enable the device 205-*b* to transmit the signal 235 having a power level that enables the device 205-*a* to both perform energy harvesting via the energy harvesting circuit 220 and decode the signal 235 via the signal decoding circuit 215.

In cases that the indication 230 indicates one or more parameters associated with the energy harvesting circuit 220, the indication 230 may include an energy conversion efficiency factor and a threshold power parameter associated with the energy harvesting circuit 220. For a linear energy harvesting model (e.g., as described with reference to Equation 1), the indication 230 may include the energy conversion efficiency factor of the energy harvesting circuit 220. For a piecewise linear energy harvesting model (e.g., as described with reference to Equation 2), the indication 230 may include the energy conversion efficiency factor and the threshold power parameter representing the threshold power of the energy harvesting circuit 220. For the polynomial energy harvesting model (e.g., as described with reference to Equation 3), the indication 230 may include multiple energy conversion efficiency factors associated with the energy harvesting circuit 220 (e.g., corresponding to the coefficients of each term of the polynomial). Additionally, the indication 230 may include a quantity of the terms in the polynomial and the threshold power parameter.

In cases that the indication 230 indicates a performance of the energy harvesting circuit 220, the indication 230 may include one or more power levels output from the energy harvesting circuit 220 that correspond to one or more power levels being input to the energy harvesting circuit 220. For example, the indication 230 may include a power table, representing the relationship between the input power to the energy harvesting circuit 220 and the energy harvested by device 205-*a*. In some examples, device 205-*b* may transmit an indication requesting the power table from device 205-*a*. The indication may include an increment that device 205-*a* may use to generate the power table. Likewise, device 205-*a* may transmit the power table including input powers (and corresponding transmit powers) from a minimum input power to a maximum input power with intermediate input powers spaced at the increment. Additionally, the indication 230 may include a target amount of converted power as described herein.

Additionally, the indication 230 may include information about energy harvesting procedures, supporting circuitry enabling energy harvesting, or a combination thereof. That is, the indication 230 may include target power levels (e.g., that enable device 205-*b* to transmit signals 235 with sufficient power), battery power levels, and the like. For example, the indication 230 may include a target amount of converted power. That is, device 205-*a* may signal a target energy harvesting power within the indication 230 and may be associated with a desired QoS. The target energy harvesting power may be represented by a table for potential levels, predefined at device 205-*a* and 205-*b* and determined by subsequent signaling, quantization levels determined based on signaling between the devices 205, or the like. In another example, the indication 230 may include a power level. The power level may be associated with a battery of device 205-*a*. The power level may represent an energy status of device 205-*a*, for example, relative to the size (or capacity) of the battery and may be presented as a percentage, a level, a decimal, or the like. Upon connection establishment, a wake up procedure, or the like, device 205-*a* may transmit the indication 230 including a first power level (e.g., an initial amount of energy) as well as the type of battery (e.g., a lithium ion battery, a lithium polymer battery, or any type of battery) of device 205-*a*. In some examples, device 205-*a* may transmit the indication including the power level in response to an event such as a request from device 205-*b*, a specific battery level (e.g., a low battery level), or any other event.

Device 205-*b* may receive the indication 230 and determine a radio frequency power 240 for one or more subsequent radio signals 235 (e.g., based on the information included in the indication 230). For example, device 205-*b* may adjust the radio frequency power 240 of the radio signals 235 to increase a power efficiency associated with the energy harvesting circuit 220 at device 205-*a* and maintain a certain QoS. That is, device 205-*b* may avoid transmitting radio signals 235 having more radio frequency power 240 than device 205-*a* has the capability of converting to DC power (e.g., based on the threshold power parameter associated with the energy harvesting circuit 220). Additionally, device 205-*b* may attempt to transmit radio signals 235 having sufficient radio frequency power 240 to ensure that a radio frequency power 240 of radio signals 235 received by the signal decoding circuit of device 205-*a* are associated with the desired QoS. Thus, the second device may transmit signals based on the determined radio frequency power 240 which may result in power savings, extended battery life, and reliable communications.

Figure 3:
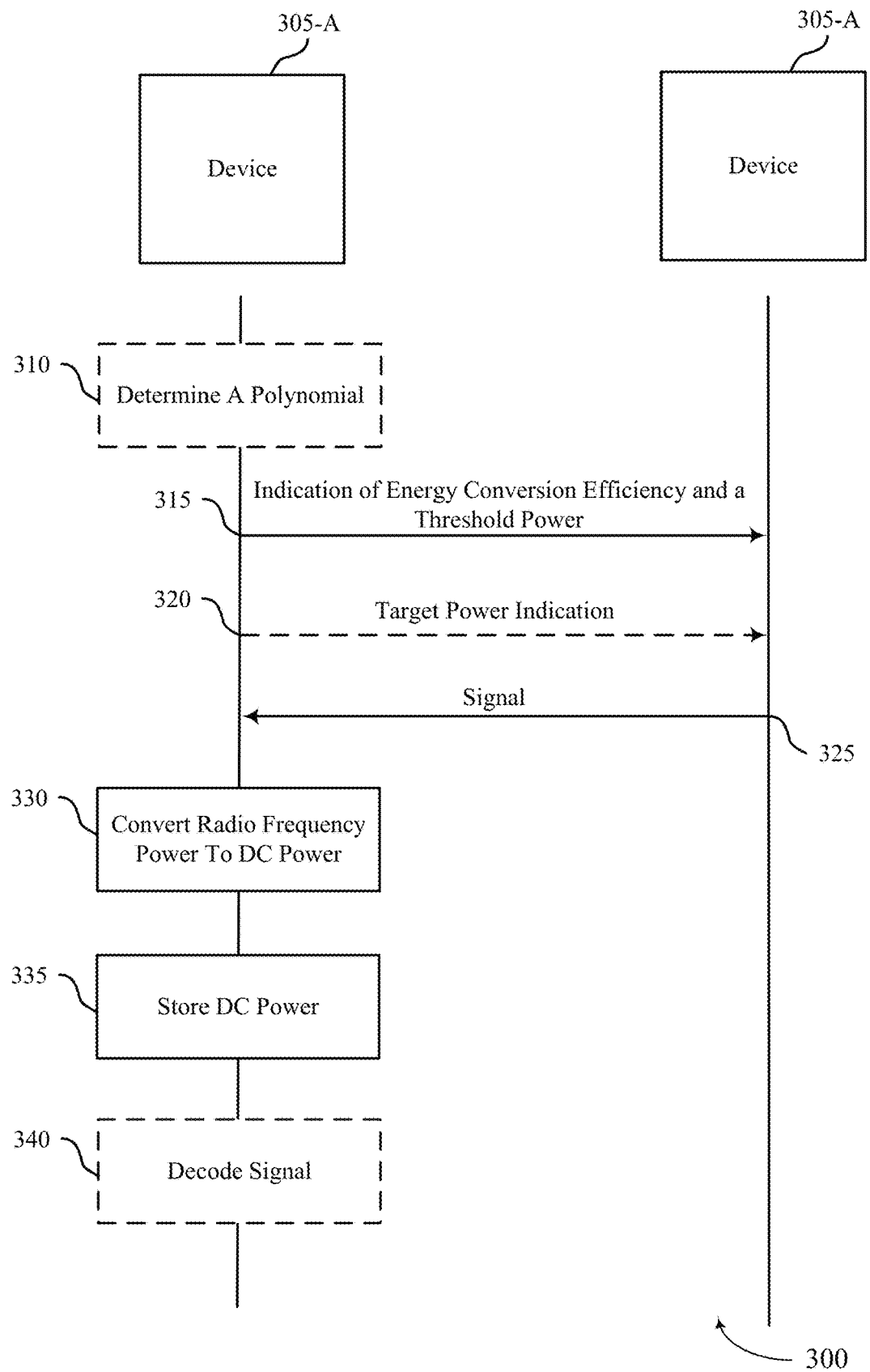
FIGS. 3 through 5 illustrate examples of process flows that support signaling for energy harvesting at a device in accordance with one or more aspects of the present disclosure.

FIG. 3 illustrates an example of a process flow 300 that supports signaling for energy harvesting at a device 305 in accordance with one or more aspects of the present disclosure. In some examples, process flow 300 may implement aspects of the systems 100 and 200 as described with reference to FIGS. 1 and 2. For example, the process flow 300 may illustrate an example of a device 305-*a* transmitting an indication to device 305-*b*. The indication may include characteristics associated with energy harvesting circuitry at the device 305-*a*. Device 305-*a* and device 305-*b* may be examples of device 205-*a* and device 205-*b*, respectively, as described with reference to FIG. 2. Alternative examples of the following may be implemented, where some processes are performed in a different order than described or are not performed. In some cases, processes may include additional features not mentioned below, or further processes may be added.

At 310, device 305-a may optionally determine a polynomial associated with an efficiency of an energy harvesting circuit at device 305-a. That is, in cases when using a non-linear energy harvesting model, device 305-a may determine a K-coefficient polynomial to represent the behavior of the energy harvesting circuit (e.g., as described with reference to Equation 3). At 315, device 305-a may transmit an indication of an energy conversion efficiency factor and a threshold power parameter to device 305-b. The indication may be associated with the energy harvesting circuit at device 305-a. In some examples, device 305-a may be configured to use a linear energy harvesting model (e.g., as described with reference to Equation 1). As such, device 305-a may transmit the indication with the energy conversion efficiency factor. In other examples, device 305-a may be configured to use a piecewise linear energy harvesting model (e.g., as described with reference to Equation 2). Here, device 305-a may transmit the indication with the energy conversion efficiency factor and the threshold power parameter. In yet other examples, device 305-a may be configured to use a non-linear energy harvesting model (e.g., as described with reference to Equation 3). In these examples, device 305-a may transmit the indication including the threshold power parameter and more than one energy conversion efficiency factors. That is, the indication may indicate a quantity of terms in the polynomial (e.g., K) and the coefficients of the polynomial which each corresponding to an energy conversion efficiency factor). In some examples, device 305-a may transmit the indication as (or within) Uu RRC signaling, sidelink RRC signaling, a Uu MAC-CE, a sidelink MAC-CE, control information (e.g., uplink control information (UCI), sidelink control information (SCI), downlink control information (DCI)), or a combination thereof. In some examples, device 305-a may transmit the second indication as (or within) MAC-CEs, sidelink MAC-CEs, physical uplink channel transmissions (e.g., physical uplink shared channel (PUSCH), physical sidelink shared channel (PSSCH), or any other uplink channel), or a combination thereof.

At 320, device 305-a may optionally transmit a target power indication to device 305-b. In other words, device 305-a may transmit, to device 305-b, an indication of a target amount of power that the device 305-a converts (e.g., from radio frequency power to DC power). The target amount of converted power may be associated with a desired QoS. The device 305-a may include the indication of the target amount of converted power, and in some cases, the desired QoS within the indication transmitted at 315 or another indication. Device 305-a may transmit the target power indication via a Uu MAC-CE, a sidelink MAC-CE, physical uplink channel transmissions (e.g., PUSCH, PSSCH, or any other uplink channel), or a combination thereof.

At 325, device 305-b may transmit a signal with a radio frequency power based on the one or more indications. For example, device 305-b may determine a radio frequency power for the signal according to the indicated energy harvesting circuit characteristics (e.g., based on receiving the indication at 315, 320, or both). That is, device 305-b may adjust the radio frequency power of subsequent signals to increase a power efficiency associated with the energy harvesting circuit at device 305-a and maintain a certain QoS. Additionally, device 305-b may attempt to transmit signals having sufficient radio frequency power to ensure that a radio frequency power of signals received by a signal decoding circuit of device 305-a are associated with the desired QoS. In other words, device 305-b may adjust the radio frequency power based on the target amount of converted power. Thus, device 305-b may select the radio frequency power based on the energy harvesting procedure indicated by device 305-a (e.g., via the indications at 315 and 320). Device 305-a may receive the signal including the radio frequency power.

At 330, device 305-a may convert at least a first portion of the radio frequency power of the signal to DC power. The first portion may be based on an energy harvesting scheme at device 305-a. For example, device 305-a may be configured to use a separated receiver architecture scheme, where device 305-a may use a specific quantity of antennas associated with the energy harvesting circuit to receive the signal and radio frequency power. As such, the first portion may be based on the number of antennas used for the energy harvesting circuit. In other examples, device 305-a may be configured to use a time switching scheme, where device 305-a may use a number of antennas for both the energy harvesting circuit and the signal decoding circuit. As such, the first portion may be based on the time allocated (e.g., via a time switcher) for the energy harvesting circuit to use the antennas. In yet other examples, device 305-a may be configured to use a power splitting scheme, where device 305-a may use a number of antennas for both the energy harvesting circuit and the signal decoding circuit. As such, the first portion may be based on the amount of power diverted (e.g., via a power splitter) to the energy harvesting circuit. Energy harvesting schemes are described in more detail with reference to FIG. 6.

At 335, device 305-a may store the converted power (e.g., DC power). In some examples, device 305-a may store the converted power in an energy storage module (e.g., a battery) in the energy harvesting circuit. The energy storage module may be used to provide power for tasks such as tasks (e.g., associated with relatively low energy) that are associated with information transfer (e.g., decoding information, encoding information, signal conversion, or other low energy tasks).

In some examples, at 340, device 305-a may decode the signal received at 325. Device 305-a may decode the signal as part of the energy harvesting scheme if the device 305-a is configured to use a compatible energy harvesting scheme (e.g., separated receiver architecture, power splitting architecture, or the like). In other words, the signal decoding circuit at device 305-a may decode the signal based on a second portion of the radio frequency power of the signal.

Figure 4:
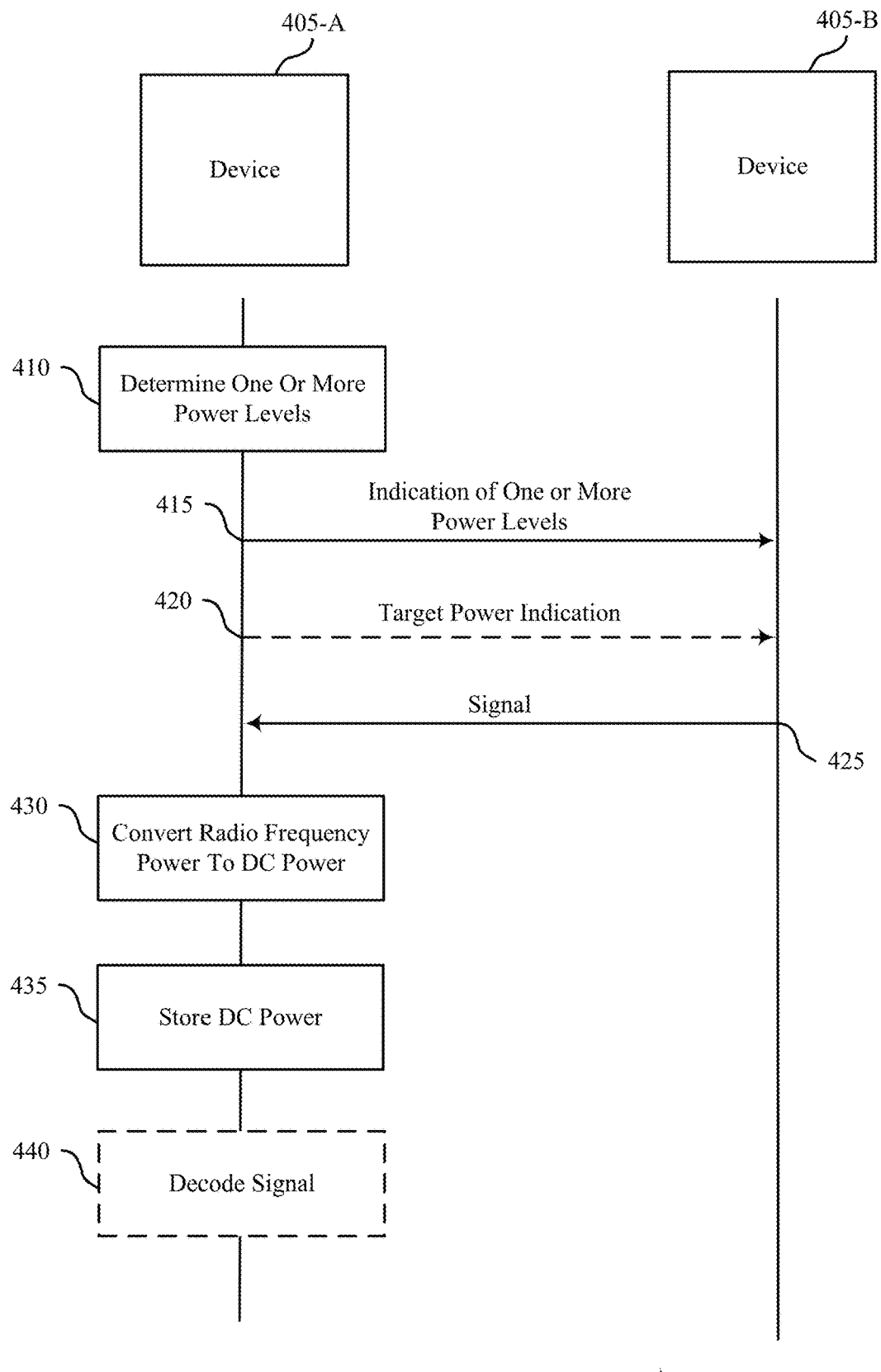

FIG. 4 illustrates an example of a process flow 400 that supports signaling for energy harvesting at a device 405 in accordance with one or more aspects of the present disclosure. In some examples, process flow 400 may implement aspects of the systems 100 and 200 as described with reference to FIGS. 1 and 2. For example, the process flow 400 may illustrate an example of a device 405-a transmitting an indication, including characteristics associated with energy harvesting circuitry, to device 405-b. Additionally, process flow 400 may implement aspects of the process flow 300. For example, device 405-a and device 405-b may be examples of device 305-a and device 305-b, respectively, as described with reference to FIG. 3. Alternative examples of the following may be implemented, where some processes are performed in a different order than described or are not performed. In some cases, processes may include additional features not mentioned below, or further processes may be added.

At 410, device 405-*a* may determine one or more power levels associated with energy harvesting circuitry at device 405-*a*. For example, device 405-*a* may determine, for each power level input to the energy harvesting circuit, a respective power level output from the energy harvesting circuit (e.g., energy collected by device 405-*a*).

At 415, device 405-*a* may transmit an indication of one or more power levels output from the energy harvesting circuit that correspond to one or more power levels being input to the energy harvesting circuit, to device 405-*b*. The indication may include a table mapping the one or more power levels output from the energy harvesting circuit to the one or more power levels being input to the energy harvesting circuit. The table may be based on determining the power levels at 410. The table may be incremented based on a predefined increment at device 405-*a*, a signaled increment from device 405-*b*, or the like. In some examples, device 405-*a* may transmit the indication as (or within) Uu RRC signaling, sidelink RRC signaling, a Uu MAC-CE, a sidelink MAC-CE, control information (e.g., UCI, DCI, SCI), or a combination thereof.

In some examples, at 420, device 405-*a* may transmit second indication to device 405-*b*, including a target power indication. In other words, device 405-*a* may transmit an indication of a target amount of converted power (e.g., DC power) to device 405-*b*. The target amount of converted power may be associated with a desired QoS. Device 405-*a* may include the indication of the target amount of converted power, and in some cases, the desired QoS within the indication transmitted at 415, the second indication, or another indication. In some examples, device 405-*a* may transmit the second indication as (or within) Uu MAC-CEs, sidelink MAC-CEs, physical uplink channel transmissions (e.g., PUSCH, PSSCH, or any other uplink channel), or a combination thereof.

Device 405-*b* may receive the indication at 415, the second indication at 420, or a combination thereof. Based on receiving the one or more indications, device 405-*b* may determine a radio frequency power for subsequent signaling according to the indicated energy harvesting circuit characteristics. For example, device 405-*b* may adjust the radio frequency power of subsequent signals to increase a power efficiency associated with the energy harvesting circuit at device 405-*a* and maintain a certain QoS. Additionally, device 405-*b* may attempt to transmit signals having sufficient radio frequency power to ensure that a radio frequency power of signals received by a signal decoding circuit of device 405-*a* are associated with the desired QoS. That is, device 405-*b* may adjust the radio frequency power based on the target amount of converted power.

At 425, device 405-*b* may transmit a signal with a radio frequency power based on the one or more indications. The radio frequency power may be associated with power efficiency at device 405-*a*. For example, the radio frequency power may correspond to the table mapping the power levels input to and output from the energy harvesting circuit at device 405-*a*. That is, device 405-*b* may choose the radio frequency power to mitigate wasting transmission resources (e.g., avoiding exceeding a power threshold as indicated by the power table). Device 405-*a* may receive the signal including the radio frequency power.

At 430, device 405-*a* may convert at least a first portion of the radio frequency power of the signal to DC power. The first portion may be based on an energy harvesting scheme at device 405-*a*. Energy harvesting schemes are described in more detail with reference to FIG. 6.

At 435, device 405-*a* may store the converted power (e.g., DC power). In some examples, device 405-*a* may store the converted power in an energy storage module in the energy harvesting circuit. Device 405-*a* may use the energy storage module to provide power for low energy tasks such as tasks associated with information transfer (e.g., decoding information, encoding information, signal conversion, or other low energy tasks).

In some examples, at 440, device 405-*a* may decode the signal received at 425. Device 405-*a* may decode the signal as part of the energy harvesting scheme if the device 405-*a* is configured to use a compatible energy harvesting scheme (e.g., separated receiver architecture, power splitting architecture, or the like). In other words, the signal decoding circuit at device 305-*a* may decode the signal based on a second portion of the radio frequency power of the signal.

Figure 5:
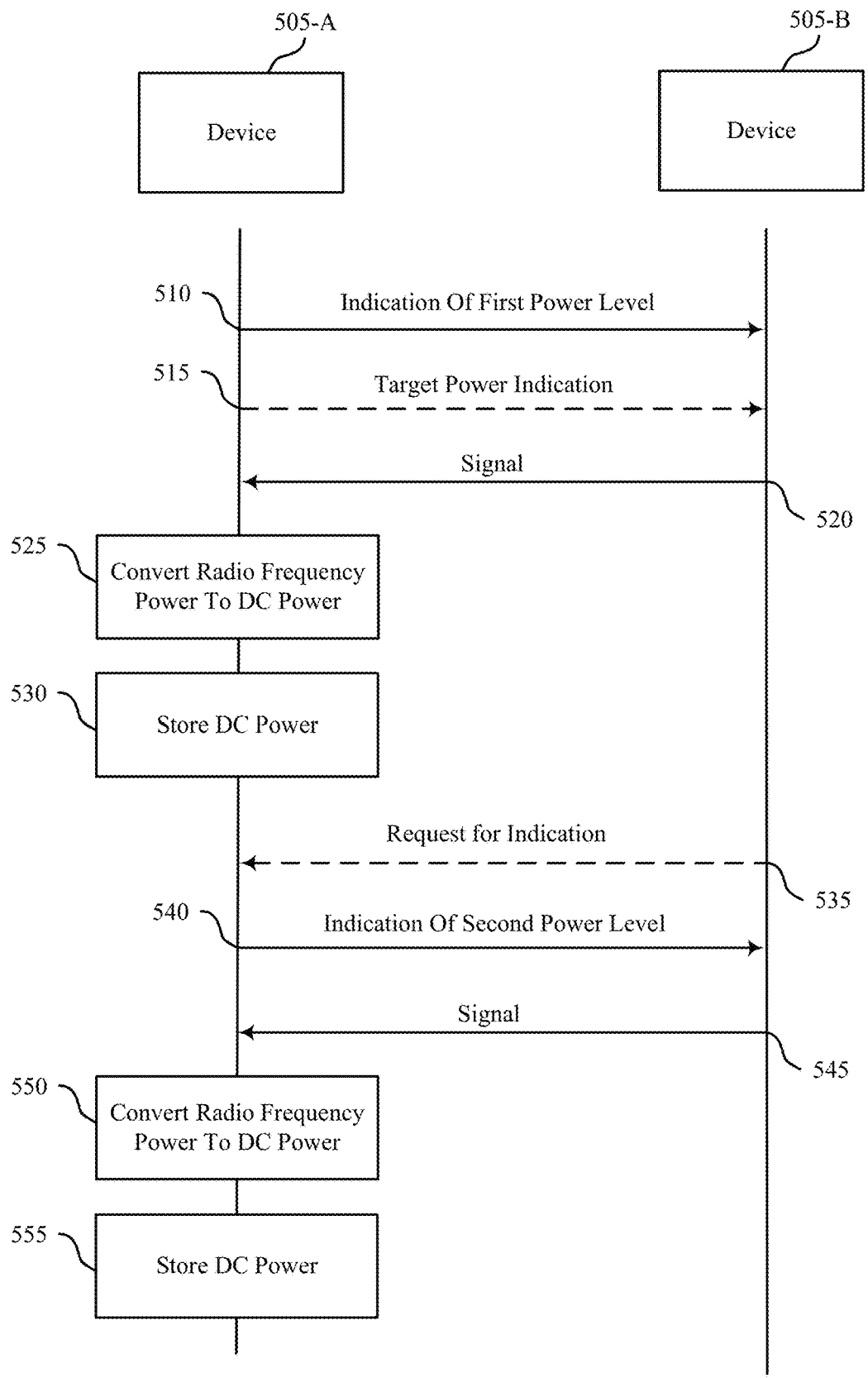

FIG. 5 illustrates an example of a process flow 500 that supports signaling for energy harvesting at a device 505 in accordance with one or more aspects of the present disclosure. In some examples, process flow 500 may implement aspects of the systems 100 and 200 as described with reference to FIGS. 1 and 2. For example, the process flow 500 may illustrate an example of a device 505-*a* transmitting one or more indications, including characteristics associated with energy harvesting circuitry, to device 505-*b*. Additionally, process flow 500 may implement aspects of the process flow 400. For example, Device 505-*a* and device 505-*b* may be examples of device 405-*a* and device 405-*b*, respectively, as described with reference to FIG. 4. Alternative examples of the following may be implemented, where some processes are performed in a different order than described or are not performed. In some cases, processes may include additional features not mentioned below, or further processes may be added.

At 510, device 505-*a* may transmit an indication of a first power level to device 505-*b*. In some examples, device 505-*a* may transmit the indication of the first power level to device 505-*b* upon connection establishment. For example, device 505-*a* may transmit the indication upon entering a network, performing a random access process, after (or part of) a wake up procedure, or any other connection establishment event. The indication of the first power level may correspond to a battery of device 505-*a*. For example, the first power level may represent an amount of energy stored in the battery. The representations of the first power level are described in more detail with reference to FIG. 2. Additionally, device 505-*a* may include an indication of a battery type (e.g., a lithium ion battery, a lithium polymer battery, or any other type of battery), within the indication of the first power level. Alternatively, the indication of the battery type may be included in a different indication than the indication of the first power level. In some examples, device 505-*a* may transmit the indication of the first power level, the indication of the battery type, or a combination thereof as (or within) Uu RRC signaling, sidelink RRC signaling, Uu MAC-CEs, sidelink MAC-CEs, physical uplink channel transmissions (e.g., PUSCH, PSSCH, or any other uplink channel), or a combination thereof.

In some examples, at 515, device 505-*a* may transmit a second indication to device 405-*b*, including a target power indication. That is, device 505-*a* may transmit an indication of a target amount of converted power (e.g., DC power) to device 505-*b*. The target amount of converted power may be associated with a desired QoS. Device 505-*a* may include the indication of the target amount of converted power, and in some cases, the desired QoS, within the indication transmitted at 510, the indication of the battery type, or another indication. In some examples, device 505-*a* may transmit the second indication as (or within) Uu MAC-CEs, sidelink MAC-CEs, physical uplink channel transmissions (e.g., PUSCH, PSSCH, or any other uplink channel), or a combination thereof.

Device 505-*b* may receive the indication at 510, the second indication at 515, the indication of the battery type, or a combination thereof. Based on receiving the one or more indications, device 505-*b* may determine a radio frequency power for subsequent signaling according to the indicated energy harvesting circuit characteristics. For example, device 505-*b* may adjust the radio frequency power of subsequent signals to increase a power efficiency associated with the energy harvesting circuit at device 505-*a* and maintain a certain QoS. Additionally, device 505-*b* may attempt to transmit signals having sufficient radio frequency power to ensure that a radio frequency power of signals received by a signal decoding circuit of device 505-*a* are associated with the desired QoS. That is, device 505-*b* may adjust the radio frequency power based on the target amount of converted power.

At 520, device 505-*b* may transmit a signal with a radio frequency power based on the one or more indications. For example, the radio frequency power may correspond to the battery power levels at device 505-*a*. That is, the radio frequency power may be chosen by device 505-*b* so as to provide sufficient power to device 505-*a* and ensure a sufficient QoS for the communications between the devices 505. Device 505-*a* may receive the signal including the radio frequency power.

At 525, device 505-*a* may convert at least a first portion of the radio frequency power of the signal to DC power. The first portion may be based on an energy harvesting scheme at device 505-*a*. Energy harvesting schemes are described in more detail with reference to FIG. 6.

At 530, device 505-*a* may store the converted power (e.g., DC power). In some examples, device 505-*a* may store the converted power in an energy storage module in the energy harvesting circuit. Device 505-*a* may use the energy storage module to provide power for low energy tasks such as tasks associated with information transfer (e.g., decoding information, encoding information, signal conversion, or other low energy tasks).

In some examples, at 535, device 505-*b* may transmit, to device 505-*a*, a request for an indication of a second power level. Device 505-*b* may transmit the request based on an event such as receiving an indication of a random access procedure, a timer configured at device 505-*b*, or any other event triggering device 505-*b* to request the indication of the second power level.

At 540, device 505-*a* may transmit an indication of a second power level to device 505-*b*. The second power level may correspond to the amount of energy stored in the battery of device 505-*a*. Device 505-*a* may transmit the indication of the second power level based on an event at device 505-*a* such as receiving the request at 535, a timer configured at device 505-*a*, a wake-up procedure, a state of the battery (e.g., a low power state), or any other event triggering device 505-*a* to transmit the indication of the second power level. In some cases, device 505-*a* may include an updated target amount of converted power in the indication of the second power level. The updated target amount of converted power may be based on the power level of the battery, a change in channel conditions, or the like. In some examples, device 505-*a* may transmit the indication of the second power level as (or within) Uu RRC signaling, sidelink RRC signaling, Uu MAC-CEs, sidelink MAC-CEs, physical uplink channel transmissions (e.g., PUSCH, PSSCH, or any other uplink channel), or a combination thereof.

At 545, device 505-*b* may transmit a second signal with a second radio frequency power based on the indication of the second power level. Device 505-*b* may choose the second radio frequency power to provide sufficient power to device 505-*a* and ensure a sufficient QoS for the communications between the devices 505. In some examples, the second radio frequency power may be based on the indication received at 540, a target amount of converted power (e.g., the updated target amount of converted power), or a combination thereof. Device 505-*a* may receive the second signal including the second radio frequency power.

At 550, device 505-*a* may convert at least a first portion of the second radio frequency power of the signal to DC power. The first portion of the second radio frequency power may be based on an energy harvesting scheme at device 505-*a*. Energy harvesting schemes are described in more detail with reference to FIG. 6.

At 555, device 505-*a* may store the converted power (e.g., DC power). In some examples, device 505-*a* may store the converted power in an energy storage module in the energy harvesting circuit. Device 505-*a* may use the energy storage module to provide power for low energy tasks such as tasks associated with information transfer (e.g., decoding information, encoding information, signal conversion, or other low energy tasks).

Figure 6A:
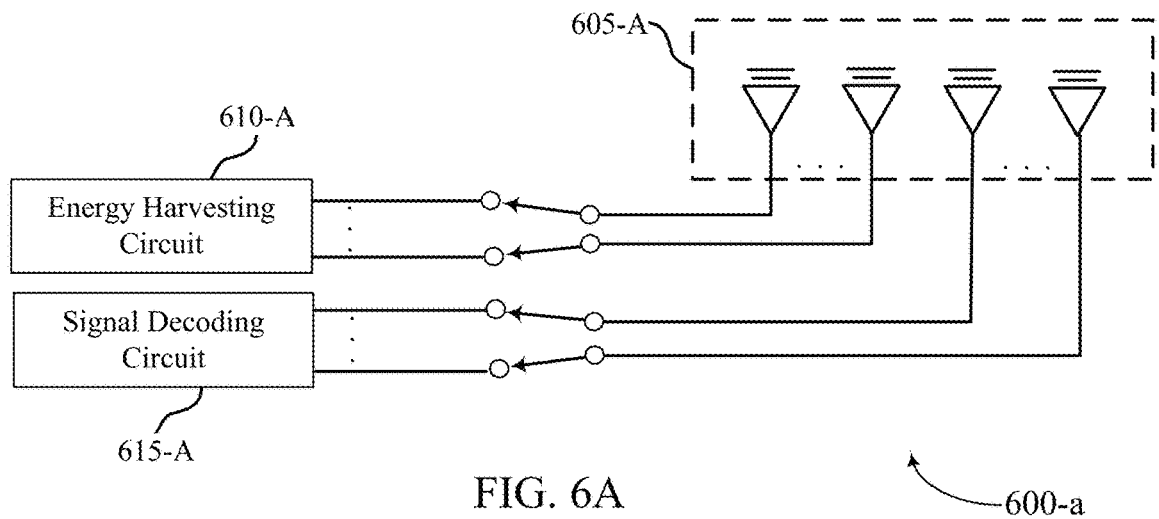
FIGS. 6A through 6C illustrates examples of energy harvesting schemes that support signaling for energy harvesting at a device in accordance with one or more aspects of the present disclosure.
Figure 6B:
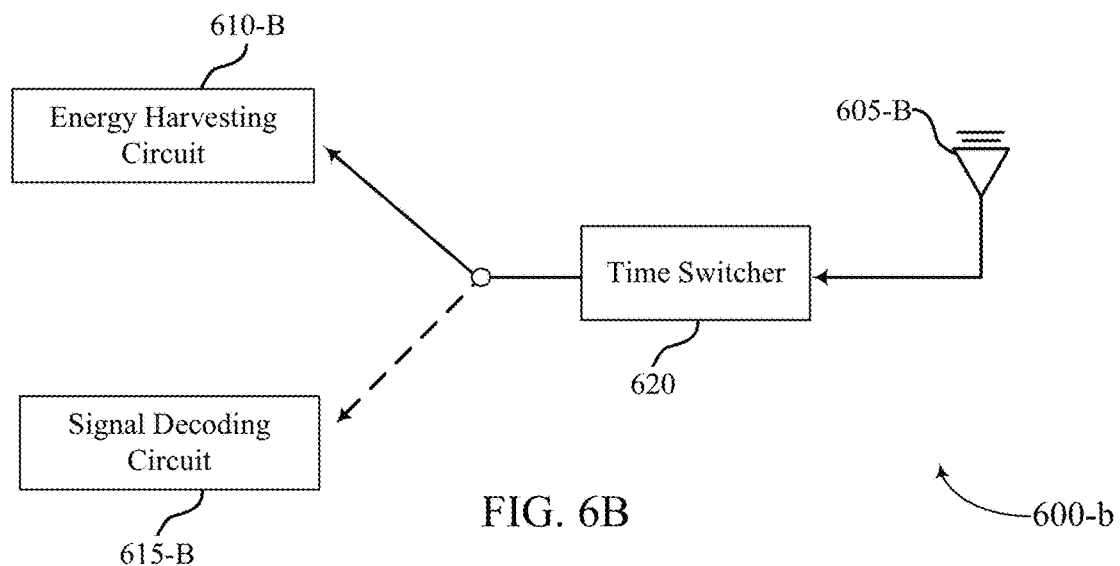
Figure 6C:
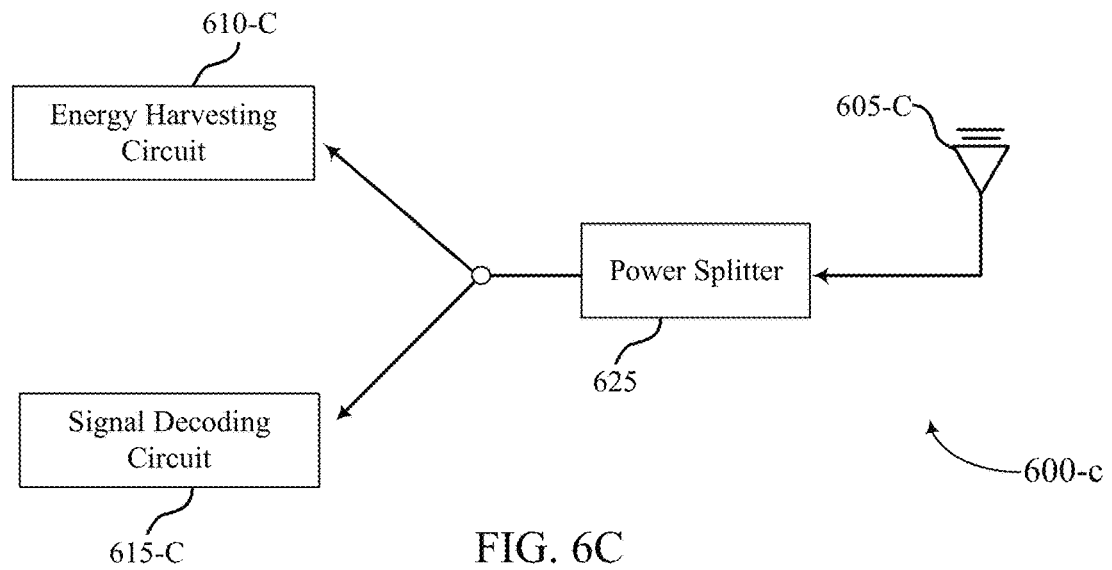

FIGS. 6A through 6C illustrate examples of energy harvesting schemes 600 that support signaling for energy harvesting at a device in accordance with aspects of the present disclosure. In some examples, energy harvesting schemes 600 may implement aspects of systems 100 and 200 as described with reference to FIGS. 1 through 5. For example, base stations 105, UEs 115, and devices 205, 305, 405, and 505 may be equipped with sufficient circuitry to implement one or more energy harvesting schemes 600. FIG. 6A illustrates an energy harvesting scheme 600-*a* associated with a separated receiver architecture, FIG. 6B illustrates an energy harvesting scheme 600-*b* associated with a time switching architecture, and FIG. 6C illustrates an energy harvesting scheme 600-*c* associated with a power splitting architecture.

In some examples, a device may be configured to support energy harvesting. That is, the device may contain (or have access to) circuitry that may perform according to one or more energy harvesting schemes 600 (e.g., energy harvesting circuits 610). In any case, the device may be equipped with one or more antennas 605 with which the device may use to receive radio frequency power from signals. The radio frequency power may be directed to an energy harvesting circuit 610, a signal decoding circuit 615, or a combination thereof.

FIG. 6A illustrates an example energy harvesting scheme 600-*a* used by a device having a separated receiver architecture. As such, the device may be equipped with a set of antennas 605-*a* where a first portion of the set of antennas 605-*a* may be associated with energy harvesting circuit 610-*a* and a second portion of the set of antennas 605-*a* may be associated with signal decoding circuit 615-*a*. That is, the portion of the antennas 605-*a* associated with the energy harvesting circuit 610-*a* may direct received radio frequency power to the energy harvesting circuit 610-*a* and the portion of the antennas 605-*a* associated with the signal decoding circuit 615-*a* may direct received radio frequency power to the signal decoding circuit 615-*a*. For example, the device may use four of the antennas 605-*a* for energy harvesting and 96 of the antennas 605-*a* for signal decoding. The number of antennas for energy harvesting and the number of antennas for signal decoding may be fixed (e.g., predefined during a manufacturing stage), configurable (e.g., based on autonomous determination at the device), or a combination thereof. Using such an architecture, the device may receive a signal with the set of antennas 605-*a* and may both decode the signal (e.g., using the signal decoding circuit 615-*a*) and harvest energy from the radio frequency power of the signal (e.g., using the energy harvesting circuit 610-*a*). That is, in a given time period the device may use the energy harvesting circuit 610-*a* to convert a first portion of the radio frequency power to DC power and the device may use the signal decoding circuit 615-*a* to decode the signal based on a second portion of the radio frequency power.

FIG. 6B illustrates an energy harvesting scheme 600-*b* associated with a time switching architecture. In such an example, a device may be equipped with a time switcher 620 that the device may use to selectively divert power, received from the antenna 605-*b*, to one or more components in the device. For example, the device may divert power to energy harvesting circuit 610-*b* for a first time period where, after the first time period, the device may divert power to signal decoding circuit 615-*b* for a second time period. That is, the energy harvested by the device may depend on the operation of the time switcher 620. As an illustrative example, the device may store an amount of energy represented by Equation 4:

$$E_j = \eta P_i |g_{i-j}|^2 T\alpha \qquad (4)$$

In Equation 4, α may represent a fraction of time allocated for energy harvesting. As such, the time switcher 620 may be configured to direct power to the energy harvesting circuit 610-*b* for a time weighted by the factor α and may be configured to direct power to the signal decoding circuit 615-*b* for a time weighted by the factor 1−α. For example, the time switcher 620 may be configured to direct a first portion of received radio frequency power to the energy harvesting circuit 610-*b* for αT and to direct a second portion of received radio frequency power to the signal decoding circuit 615-*b* for (1−α)T. α may be predefined at the device, determined at the device (e.g., based on a QoS), signaled by another device, or the like. Using such an architecture, the device may receive a signal with the antennas 605-*b* and may both decode the signal (e.g., using the signal decoding circuit 615-*b*) and harvest energy from the radio frequency power of the signal (e.g., using the energy harvesting circuit 610-*b*). That is, at a first time, the device may use the energy harvesting circuit 610-*b* to convert a first portion of the radio frequency power to DC power and, at a second time, the device may use the signal decoding circuit 615-*b* to decode the signal based on a second portion of the radio frequency power.

FIG. 6C illustrates an energy harvesting scheme 600-*c* associated with a power splitting architecture. As such, the device may be equipped with a power splitter 625 that the device may use to split power, received from the antenna 605-*c*, to one or more components in the device. For example, the device may split received radio frequency power, directing a first portion of the radio frequency power to energy harvesting circuit 610-*c* and a second portion of the radio frequency power to signal decoding circuit 615-*c*. Thus, the energy harvested by the device may depend on the operation of the power splitter 625. As an illustrative example, the device may store an amount of energy represented by Equation 5:

$$E_j = \eta \rho P_i |g_{i-j}|^2 T \qquad (5)$$

In Equation 5, ρ may represent a fraction of power allocated for energy harvesting. As such, in a given time period, the power splitter 625 may be configured to split received radio frequency power, directing a first portion of the radio frequency power (e.g., weighted by ρ) to the energy harvesting circuit 610-*c* and directing a second portion of the radio frequency power (e.g., weighted by 1−ρ) to the signal decoding circuit 615-*c*. Using such an architecture, the device may receive a signal with the antenna 605-*c* and may both decode the signal (e.g., using the signal decoding circuit 615-*c*) and harvest energy from the radio frequency power of the signal (e.g., using the energy harvesting circuit 610-*c*). That is, in a given time period the device may use the energy harvesting circuit 610-*c* to convert a first portion of the radio frequency power to DC power and the device may use the signal decoding circuit 615-*c* to decode the signal based on a second portion of the radio frequency power.

While described individually, in some examples, a device may employ a combination of energy harvesting schemes 600. That is, the device may have circuitry enabling the device to utilize more than one energy harvesting scheme 600. For example, the device may contain a time switcher 620 and a power splitter 625 such that the device may use a combination of a time switching energy harvesting scheme 600-*b* and a power splitting energy harvesting scheme 600-*c*.

In some examples the device may signal one or more characteristics, to another device, that may depend on the energy harvesting scheme used by the device. For example, the device may include a number of antennas 605 associated with an energy harvesting circuit 610, a parameter indicating a time associated with energy harvesting, a parameter indicating a fraction of power associated with energy harvesting, or the like, within one or more indications such as those described with reference to the process flows 300, 400, and 500.

Figure 7:
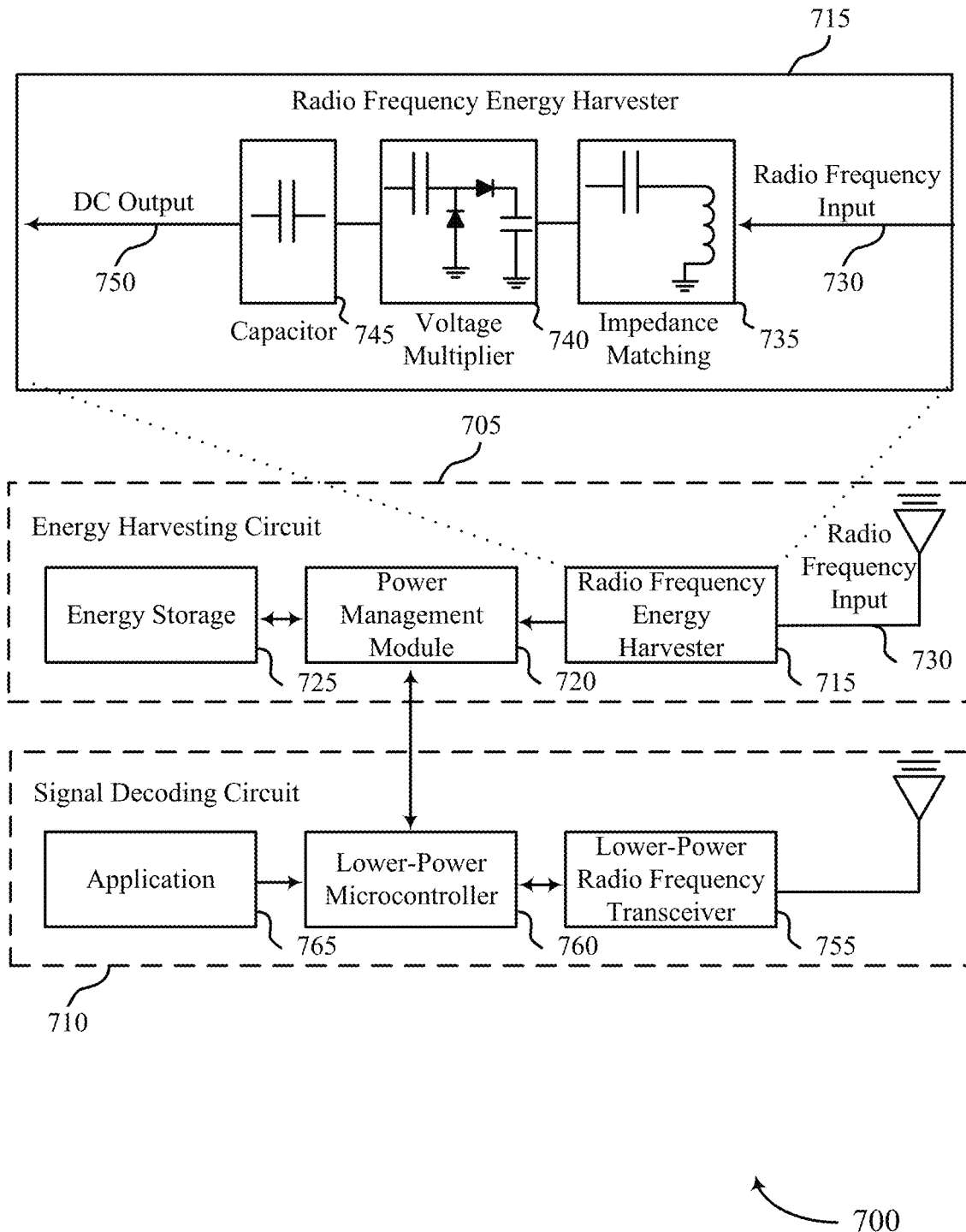
FIG. 7 illustrates an example of circuitry that supports signaling for energy harvesting at a device in accordance with one or more aspects of the present disclosure.

FIG. 7 illustrates an example of circuitry 700 that supports signaling for energy harvesting at a device in accordance with aspects of the present disclosure. In some examples, circuitry 700 may implement aspects of systems 100 and 200 as described with reference to FIGS. 1 through 6. For example, devices (e.g., as described with reference to FIGS. 1 through 6) may include circuitry 700 to perform energy harvesting.

In some examples, the circuitry 700 may include diodes, capacitors, inductors, and other circuit components combined and configured to allow circuitry 700 to perform energy harvesting. The circuitry 700 may include an energy harvesting circuit 705 (e.g., which may be an example of energy harvesting circuits as described herein). The energy harvesting circuit 705 may include a radio frequency energy harvester 715, a power management module 720, and an energy storage 725. The radio frequency energy harvester 715 may convert radio frequency power to DC power. For example, the radio frequency energy harvester 715 may receive a radio frequency input 730 from an antenna (e.g., a radio frequency antenna) and, using one or more components such as an impedance matching circuit 735, a voltage multiplier 740, a capacitor 745, the radio frequency energy harvester 715 may convert the radio frequency input 730 to the DC output 750. For example, the radio frequency energy harvester 715 may convert energy from an electromagnetic domain to an electrical domain. For example, the radio frequency energy harvester 715 may receive the radio frequency input 730 (e.g., having power associated with an electromagnetic field) and may convert the radio frequency input 730 to the DC output 750 (e.g., having power associated with a voltage and current). The power management module 720 may determine to store the DC output 750 (e.g., at a battery) or use the DC output 750 for low power tasks (e.g., information transmission) subsequent to the conversion. Such low power tasks may include providing power to any one of the components within the circuitry 700 (e.g., radio frequency energy harvester 715, power management module 720, lower-power radio frequency transceiver 755, lower-power microcontroller 760, antennas, among others). Upon deciding to store the energy output, the power management module 720 may store the energy output in the energy storage 725.

In some examples, the circuitry may include a signal decoding circuit 710 to perform tasks associated with information transmission and reception. For example, the signal decoding circuit 710 may include a lower-power radio frequency transceiver 755, a lower-power microcontroller 760, and an application 765. The lower-power radio frequency transceiver 755 may transmit and receive signals. The lower-power microcontroller 760 may process data. For example, the lower-power microcontroller 760 may process data received from lower-power radio frequency transceiver 755. In another example, the lower-power microcontroller 760 may receive data from the application 765, where the lower-power microcontroller 760 may process the data and transmit the processed data to the lower-power radio frequency transceiver 755 for subsequent transmission. The lower-power microcontroller may 760 process data using power received from the power management module 720. For example, the power management module 720 may direct energy output from the radio frequency energy harvester 715 to the lower-power microcontroller 760. In another example, the power management module 720 may receive energy from the energy storage 725 and direct the energy to the lower-power microcontroller 760. As such, the lower-power microcontroller 760 may receive the energy from the power management module 720 for processing data.

Utilizing the signaling techniques for energy harvesting as described herein may allow a device to perform energy harvesting efficiently, increasing the amount of energy received from a signal for performing low energy tasks. Thus, the device may increase battery life and maintain a desired QoS for communications.

Figure 8:
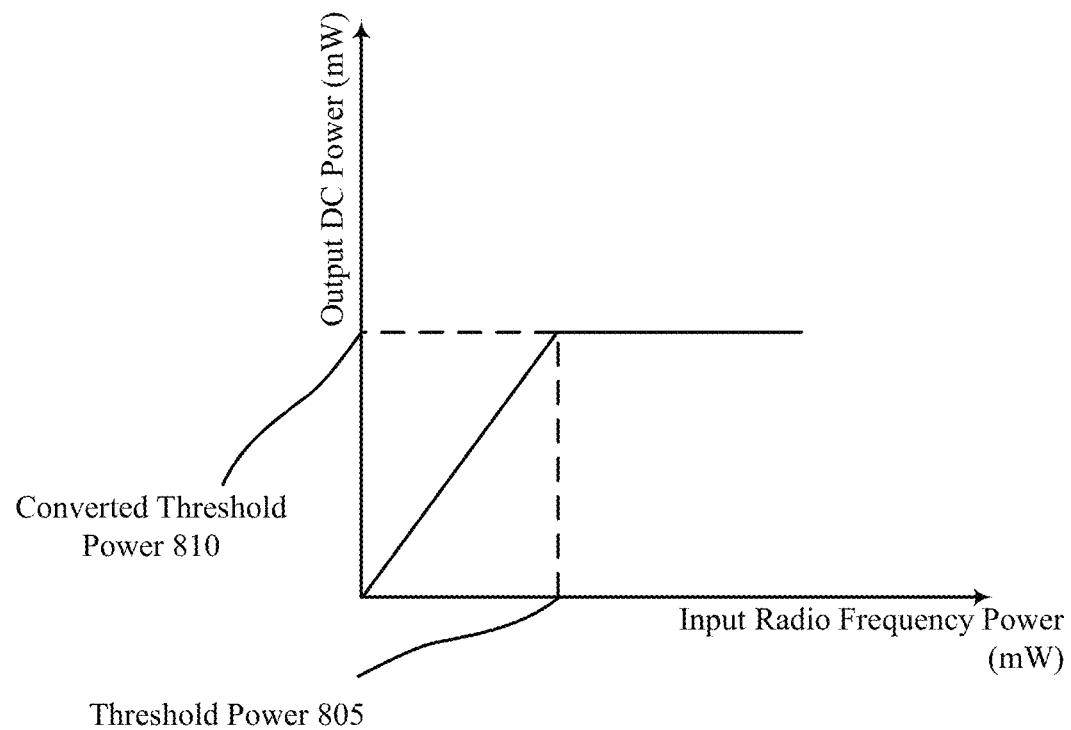
FIG. 8 illustrates an example of a power diagram that supports signaling for energy harvesting at a device in accordance with one or more aspects of the present disclosure.

FIG. 8 illustrates an example of a power diagram 800 that supports signaling for energy harvesting at a device in accordance with one or more aspects of the present disclosure. In some examples, power diagram 800 may illustrate a relationship between the radio frequency input 730 and the DC output in circuitry 700 as described with reference to FIG. 7.

Power diagram 800 may relate input radio frequency power (e.g., from signaling from a transmitting device) into an energy harvesting circuit to the output DC power converted by the energy harvesting circuit. As an illustrative example, power diagram 800 may be associated with a piecewise linear energy harvesting model. However, a device may be associated with other power diagrams 800 associated with a linear energy harvesting model, a non-linear energy harvesting model (e.g., a polynomial model), or any other energy harvesting model. For example, the power diagram 800 may be associated with a polynomial energy harvesting model (e.g., as described with reference to Equation 3). Here, the regional curve start point (e.g., $P_{Start}(L)$) may be by 0 (or substantially near 0), the saturation portion start point (e.g., $P_{th\ LOW}(L)$) may correspond to the threshold power 805, and the saturation portion end point (e.g., $P_{th\ HIGH}(L)$) may be infinity mW.

In the example provided in power diagram 800, up until a threshold power 805, an increase in the input radio frequency power may correspond to a linear increase of the output DC power. The slope of this linear relationship may be represented by an energy conversion efficiency factor. Increasing the input radio frequency power past the threshold power 805 may result in no change to the output DC power. That is, the energy harvesting circuit may have a saturation power, such as converted threshold power 810. Thus, an input radio frequency power equal (or substantially equivalent) to the threshold power 805 may correspond to efficient system function. However, in some cases, a transmitting device may be unaware of the power diagram 800 or the characteristics thereof. Thus, the transmitting device may be unaware of potential inefficiencies when transmitting signals. For example, the transmitting device may transmit signals unaware of the energy harvesting circuit characteristics and may transmit a signal to a receiving device with an input radio frequency power that is greater than the threshold power 805.

Implementing the techniques as described herein may allow devices to signal for energy harvesting enabling devices to maximize output DC power while mitigating the waste of communication resources.

Figure 9:
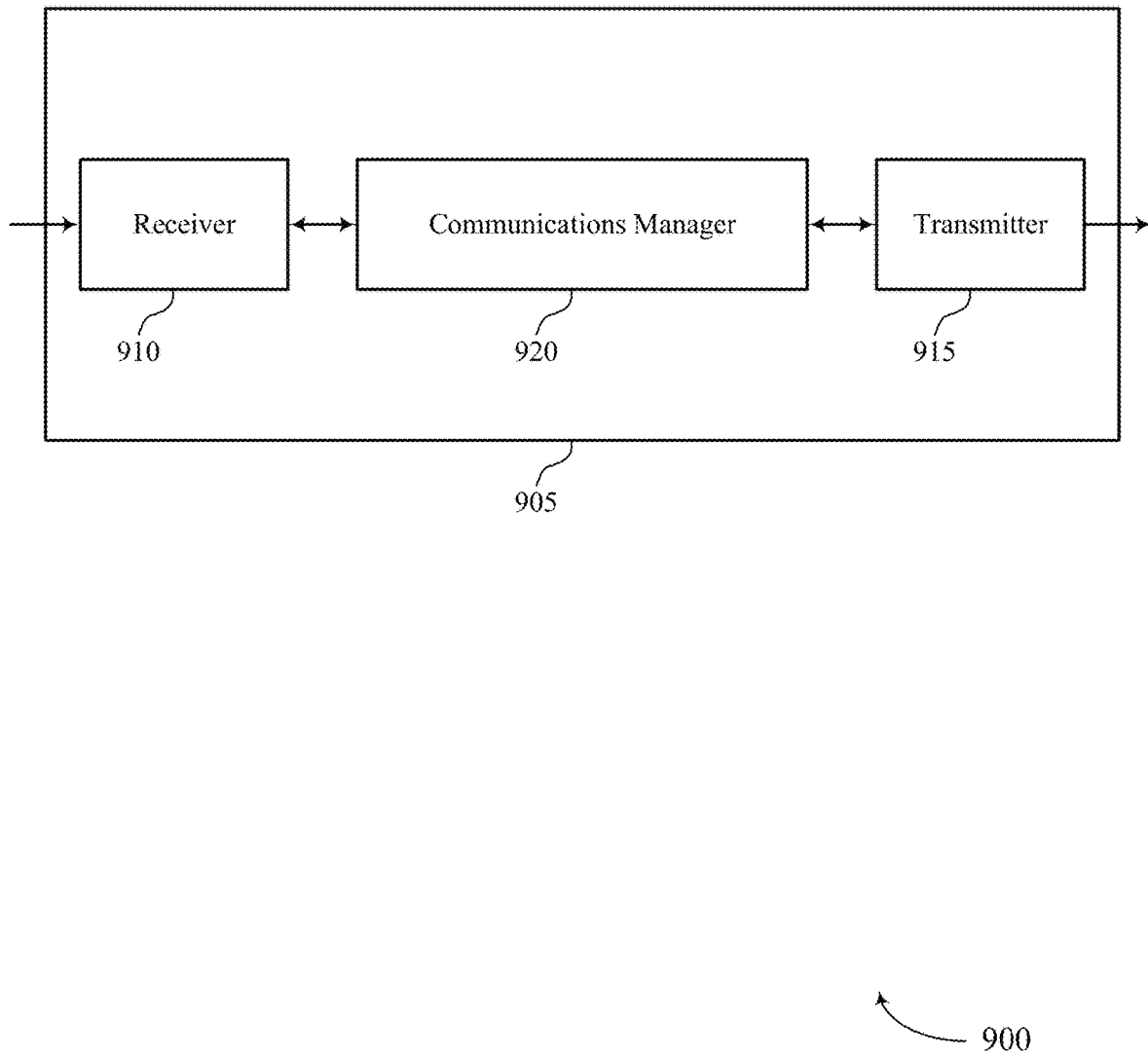
FIGS. 9 and 10 show block diagrams of devices that support signaling for energy harvesting at a device in accordance with one or more aspects of the present disclosure.

FIG. 9 shows a block diagram 900 of a device 905 that supports signaling for energy harvesting at a device in accordance with one or more aspects of the present disclosure. The device 905 may be an example of aspects of a First Device as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to signaling for energy harvesting at a device). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to signaling for energy harvesting at a device). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of signaling for energy harvesting at a device as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application specific integrated circuit (ASIC), a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first device in accordance with examples as disclosed herein. For example, the communications manager 920 may be configured as or otherwise support a means for transmitting, to a second device, an indication of an energy conversion efficiency factor and a threshold power parameter. The communications manager 920 may be configured as or otherwise support a means for receiving, from the second device, a signal including a radio frequency power, where the radio frequency power is based on the transmitted indication. The communications manager 920 may be configured as or otherwise support a means for converting at least a first portion of the radio frequency power of the signal to DC power.

Additionally or alternatively, the communications manager 920 may support wireless communication at a first device in accordance with examples as disclosed herein. For example, the communications manager 920 may be configured as or otherwise support a means for transmitting, to a second device, an indication of a set of power levels including a first quantity of input radio frequency power levels and a second quantity of output DC power levels. The communications manager 920 may be configured as or otherwise support a means for receiving, from the second device, a signal having a radio frequency power that is based on the transmitted indication. The communications manager 920 may be configured as or otherwise support a means for converting at least a first portion of the radio frequency power of the signal to DC power.

Additionally or alternatively, the communications manager 920 may support wireless communication at a first device in accordance with examples as disclosed herein. For example, the communications manager 920 may be configured as or otherwise support a means for transmitting, to a second device, a first indication of a first power level of a battery of the first device. The communications manager 920 may be configured as or otherwise support a means for receiving, from the second device, a signal including a radio frequency power, where the radio frequency power is based on the transmitted first indication. The communications manager 920 may be configured as or otherwise support a means for storing at least a first portion of the radio frequency power of the signal as DC power at the first device. The communications manager 920 may be configured as or otherwise support a means for transmitting, based on the storing, a second indication of a second power level of the battery to the second device.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for signaling as part of energy harvesting, mitigating wasted transmission resources at a transmitting device and maximizing DC power acquisition.

Figure 10:
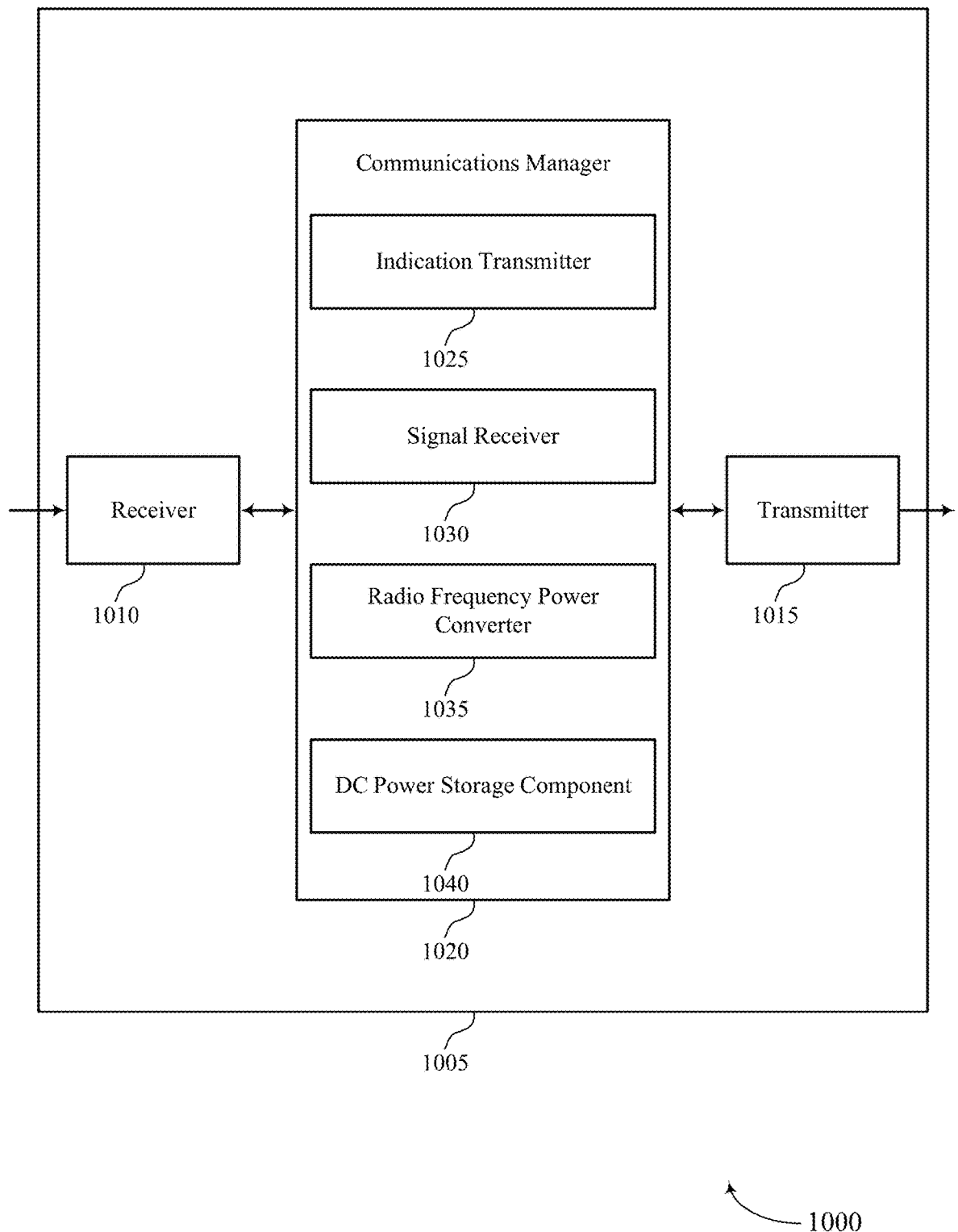

FIG. 10 shows a block diagram 1000 of a device 1005 that supports signaling for energy harvesting at a device in accordance with one or more aspects of the present disclosure. The device 1005 may be an example of aspects of a device 905 or a first device as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to signaling for energy harvesting at a device). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to signaling for energy harvesting at a device). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of signaling for energy harvesting at a device as described herein. For example, the communications manager 1020 may include an indication transmitter 1025, a signal receiver 1030, a radio frequency power converter 1035, a DC power storage component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first device in accordance with examples as disclosed herein. The indication transmitter 1025 may be configured as or otherwise support a means for transmitting, to a second device, an indication of an energy conversion efficiency factor and a threshold power parameter. The signal receiver 1030 may be configured as or otherwise support a means for receiving, from the second device, a signal including a radio frequency power, where the radio frequency power is based on the transmitted indication. The radio frequency power converter 1035 may be configured as or otherwise support a means for converting at least a first portion of the radio frequency power of the signal to DC power.

Additionally or alternatively, the communications manager 1020 may support wireless communication at a first device in accordance with examples as disclosed herein. The indication transmitter 1025 may be configured as or otherwise support a means for transmitting, to a second device, an indication of a set of power levels including a first quantity of input radio frequency power levels and a second quantity of output DC power levels. The signal receiver 1030 may be configured as or otherwise support a means for receiving, from the second device, a signal having a radio frequency power that is based on the transmitted indication. The radio frequency power converter 1035 may be configured as or otherwise support a means for converting at least a first portion of the radio frequency power of the signal to DC power.

Additionally or alternatively, the communications manager 1020 may support wireless communication at a first device in accordance with examples as disclosed herein. The indication transmitter 1025 may be configured as or otherwise support a means for transmitting, to a second device, a first indication of a first power level of a battery of the first device. The signal receiver 1030 may be configured as or otherwise support a means for receiving, from the second device, a signal including a radio frequency power, where the radio frequency power is based on the transmitted first indication. The DC power storage component 1040 may be configured as or otherwise support a means for storing at least a first portion of the radio frequency power of the signal as DC power at the first device. The indication transmitter 1025 may be configured as or otherwise support a means for transmitting, based on the storing, a second indication of a second power level of the battery to the second device.

Figure 11:
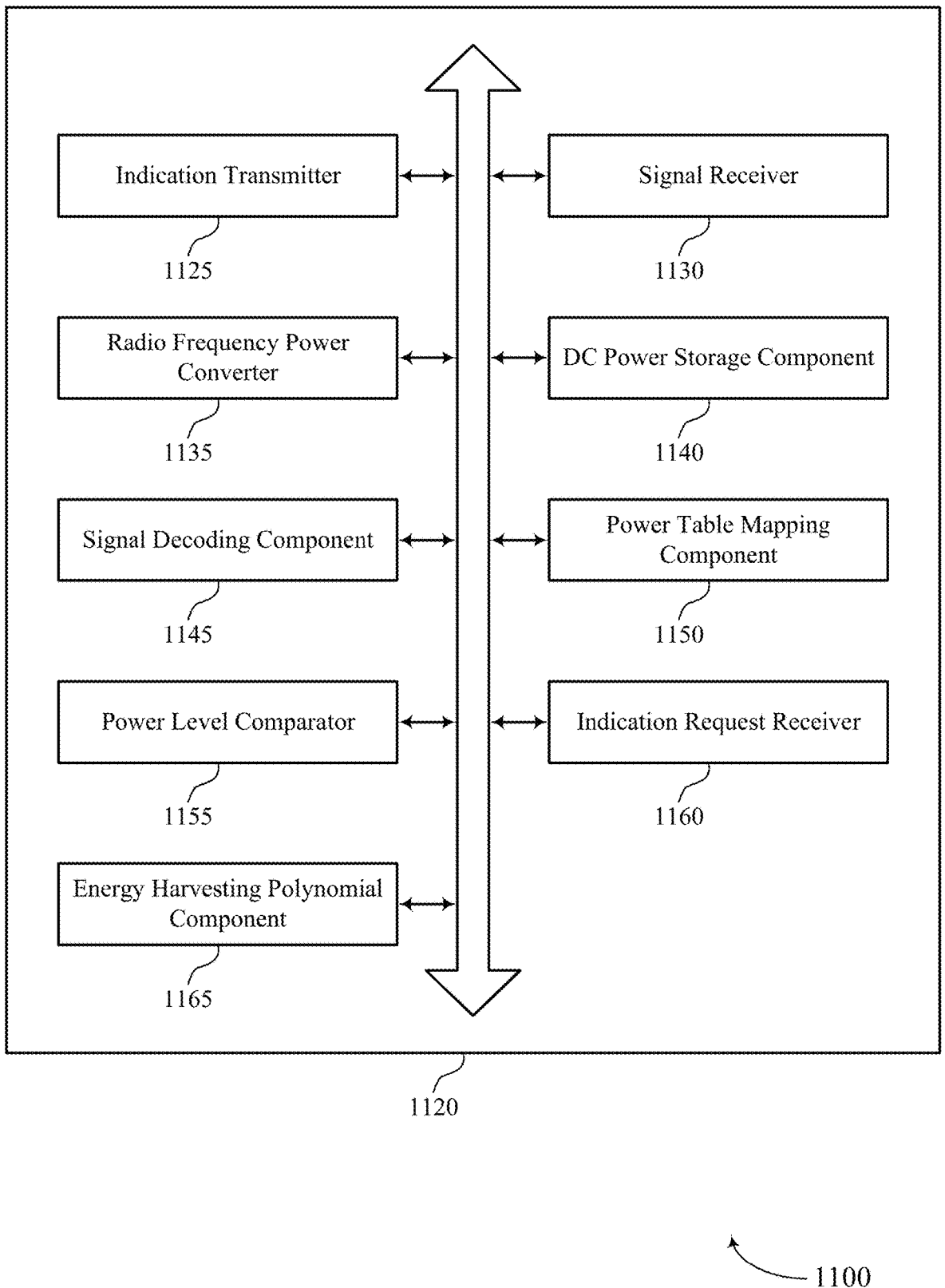
FIG. 11 shows a block diagram of a communications manager that supports signaling for energy harvesting at a device in accordance with one or more aspects of the present disclosure.

FIG. 11 shows a block diagram 1100 of a communications manager 1120 that supports signaling for energy harvesting at a device in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of signaling for energy harvesting at a device as described herein. For example, the communications manager 1120 may include an indication transmitter 1125, a signal receiver 1130, a radio frequency power converter 1135, a DC power storage component 1140, a signal decoding component 1145, a power table mapping component 1150, a power level comparator 1155, an indication request receiver 1160, an energy harvesting polynomial component 1165, or any combination thereof. Each of these components may communicate, directly or indirectly, with one another (e.g., via one or more buses).

The communications manager 1120 may support wireless communication at a first device in accordance with examples as disclosed herein. The indication transmitter 1125 may be configured as or otherwise support a means for transmitting, to a second device, an indication of an energy conversion efficiency factor and a threshold power parameter. The signal receiver 1130 may be configured as or otherwise support a means for receiving, from the second device, a signal including a radio frequency power, where the radio frequency power is based on the transmitted indication. The radio frequency power converter 1135 may be configured as or otherwise support a means for converting at least a first portion of the radio frequency power of the signal to DC power.

In some examples, the indication transmitter 1125 may be configured as or otherwise support a means for transmitting, to the second device, a second indication of one or more additional energy conversion efficiency factors.

In some examples, the energy harvesting polynomial component 1165 may be configured as or otherwise support a means for determining, by the first device, a model associated with an efficiency of energy harvesting, where the energy conversion efficiency factor and the one or more additional energy conversion efficiency factors are based on the model.

In some examples, the indication transmitter 1125 may be configured as or otherwise support a means for transmitting, to the second device, a second indication of a target amount of converted DC power, where the radio frequency power of the received signal is further based on the target amount of converted DC power.

In some examples, the indication transmitter 1125 may be configured as or otherwise support a means for transmitting the second indication via a MAC-CE, a transmission via a physical uplink channel, or a combination thereof.

In some examples, the indication transmitter 1125 may be configured as or otherwise support a means for transmitting the indication via RRC signaling, a MAC-CE, control information, or a combination thereof.

In some examples, the DC power storage component 1140 may be configured as or otherwise support a means for storing the DC power at the first device based on the converting.

In some examples, the signal decoding component 1145 may be configured as or otherwise support a means for decoding the signal based on a second portion of the radio frequency power of the signal.

Additionally or alternatively, the communications manager 1120 may support wireless communication at a first device in accordance with examples as disclosed herein. In some examples, the indication transmitter 1125 may be configured as or otherwise support a means for transmitting, to a second device, an indication of a set of power levels including a first quantity of input radio frequency power levels and a second quantity of output DC power levels. In some examples, the signal receiver 1130 may be configured as or otherwise support a means for receiving, from the second device, a signal having a radio frequency power that is based on the transmitted indication. In some examples, the radio frequency power converter 1135 may be configured as or otherwise support a means for converting at least a first portion of the radio frequency power of the signal to DC power.

In some examples, the power table mapping component 1150 may be configured as or otherwise support a means for transmitting a mapping between the first quantity of input radio frequency power levels and the second quantity of output DC power levels.

In some examples, the power level comparator 1155 may be configured as or otherwise support a means for determining, for each of the first quantity of input radio frequency power levels, a corresponding one of the second quantity of output DC power levels, where transmitting the indication is based on the determining.

In some examples, the indication transmitter 1125 may be configured as or otherwise support a means for transmitting, to the second device, a second indication of a target amount of converted DC power, where the radio frequency power of the received signal is based on the target amount of converted DC power.

In some examples, the indication transmitter 1125 may be configured as or otherwise support a means for transmitting the second indication via a MAC-CE, a transmission via a physical uplink channel, or a combination thereof.

In some examples, the indication transmitter 1125 may be configured as or otherwise support a means for transmitting the indication via RRC signaling, a MAC-CE, control information, or a combination thereof.

In some examples, the DC power storage component 1140 may be configured as or otherwise support a means for storing the DC power at the first device based on the converting.

In some examples, the signal decoding component 1145 may be configured as or otherwise support a means for decoding the signal based on a second portion of the radio frequency power of the signal.

Additionally or alternatively, the communications manager 1120 may support wireless communication at a first device in accordance with examples as disclosed herein. In some examples, the indication transmitter 1125 may be configured as or otherwise support a means for transmitting, to a second device, a first indication of a first power level of a battery of the first device. In some examples, the signal receiver 1130 may be configured as or otherwise support a means for receiving, from the second device, a signal including a radio frequency power, where the radio frequency power is based on the transmitted first indication. The DC power storage component 1140 may be configured as or otherwise support a means for storing at least a first portion of the radio frequency power of the signal as DC power at the first device. In some examples, the indication transmitter 1125 may be configured as or otherwise support a means for transmitting, based on the storing, a second indication of a second power level of the battery to the second device.

In some examples, the indication request receiver 1160 may be configured as or otherwise support a means for receiving, from the second device, a request for the second indication of the second power level of the battery, where transmitting the second indication is based on receiving the request for the second indication from the second device.

In some examples, the indication transmitter 1125 may be configured as or otherwise support a means for transmitting, to the second device, a third indication of a type of the battery of the first device, where receiving the signal is based on transmitting the third indication of the type of the battery of the first device.

In some examples, the indication transmitter 1125 may be configured as or otherwise support a means for transmitting, to the second device, a third indication of a target amount of converted DC power, where the radio frequency power of the received signal is based on the target amount of converted DC power.

In some examples, the indication transmitter 1125 may be configured as or otherwise support a means for transmitting the second indication via a MAC-CE, a transmission via a physical uplink channel, or a combination thereof.

In some examples, the signal receiver 1130 may be configured as or otherwise support a means for receiving, from the second device, a second signal including a second radio frequency power that is based on the second power level of the battery, where receiving the second signal is based on transmitting the second indication.

In some examples, the radio frequency power converter 1135 may be configured as or otherwise support a means for converting at least the first portion of the radio frequency power of the signal to the DC power, where the storing is based on the converting.

Figure 12:
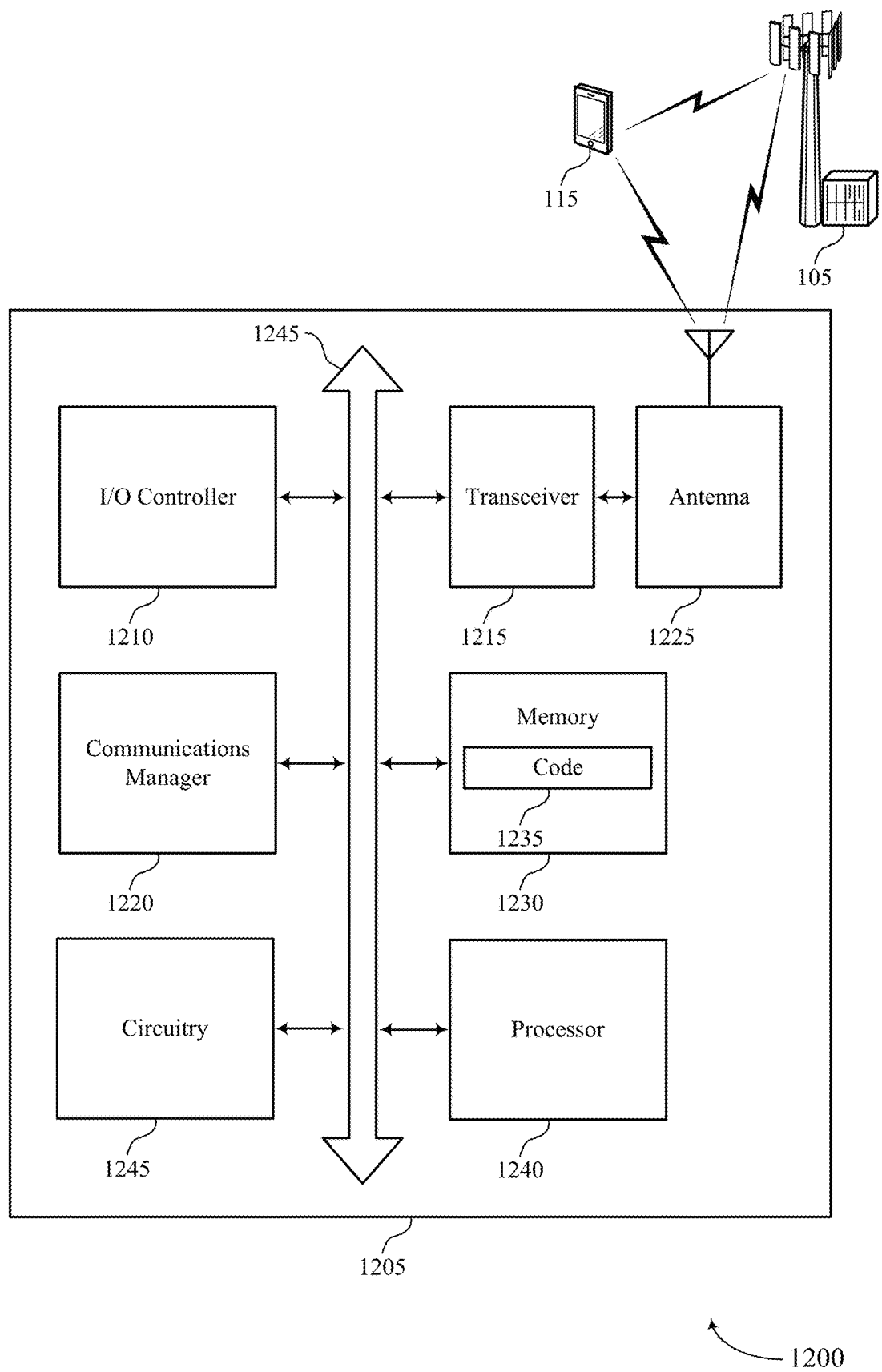
FIG. 12 shows a diagram of a system including a device that supports signaling for energy harvesting at a device in accordance with one or more aspects of the present disclosure.

FIG. 12 shows a diagram of a system 1200 including a device 1205 that supports signaling for energy harvesting at a device in accordance with one or more aspects of the present disclosure. The device 1205 may be an example of or include the components of a device 905, a device 1005, or a first device (e.g., a UE, a base station, a sidelink enabled device, or any other device) as described herein. The device 1205 may include components for bi-directional voice and data communications including components for transmitting and receiving communications, such as a communications manager 1220, an I/O controller 1210, a transceiver 1215, an antenna 1225, a memory 1230, code 1235, a processor 1240, and circuitry 1245. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals unincluded within the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random-access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic input/output system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting signaling for energy harvesting at a device). For example, the device 1205 or a component of the device 1205 may include a processor 1240 and memory 1230 coupled to the processor 1240, the processor 1240 and memory 1230 configured to perform various functions described herein.

In some examples, device 1205 may have circuitry 1245 which may be associated with energy harvesting at device 1205. For example, circuitry 1245 may be (or may include) an energy harvesting circuit such as energy harvesting circuit 220 as described with reference to FIG. 2. In another example, circuitry 1245 may be (or may include) a signal decoding circuit such as signal decoding circuit 215 as described with reference to FIG. 2. Circuitry 1245 may include or may support function (or a means of function) for any and all circuitry as described with reference to FIG. 7.

The communications manager 1220 may support wireless communication at a first device in accordance with examples as disclosed herein. For example, the communications manager 1220 may be configured as or otherwise support a means for transmitting, to a second device, an indication of an energy conversion efficiency factor and a threshold power parameter. The communications manager 1220 may be configured as or otherwise support a means for receiving, from the second device, a signal including a radio frequency power, where the radio frequency power is based on the transmitted indication. The communications manager 1220 may be configured as or otherwise support a means for converting at least a first portion of the radio frequency power of the signal to DC power.

Additionally or alternatively, the communications manager 1220 may support wireless communication at a first device in accordance with examples as disclosed herein. For example, the communications manager 1220 may be configured as or otherwise support a means for transmitting, to a second device, an indication of a set of power levels including a first quantity of input radio frequency power levels and a second quantity of output DC power levels. The communications manager 1220 may be configured as or otherwise support a means for receiving, from the second device, a signal having a radio frequency power that is based on the transmitted indication. The communications manager 1220 may be configured as or otherwise support a means for converting at least a first portion of the radio frequency power of the signal to DC power.

Additionally or alternatively, the communications manager 1220 may support wireless communication at a first device in accordance with examples as disclosed herein. For example, the communications manager 1220 may be configured as or otherwise support a means for transmitting, to a second device, a first indication of a first power level of a battery of the first device. The communications manager 1220 may be configured as or otherwise support a means for receiving, from the second device, a signal including a radio frequency power, where the radio frequency power is based on the transmitted first indication. The communications manager 1220 may be configured as or otherwise support a means for storing at least a first portion of the radio frequency power of the signal as DC power at the first device. The communications manager 1220 may be configured as or otherwise support a means for transmitting, based on the storing, a second indication of a second power level of the battery to the second device.

By including or configuring the communications manager 1220 in accordance with examples as described herein, the device 1205 may support techniques for receiving a sufficient amount of radio frequency power during energy harvesting, increasing communications efficiency, and enhancing system function.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of signaling for energy harvesting at a device as described herein, or the processor 1240 and the memory 1230 may be otherwise configured to perform or support such operations.

Figure 13:
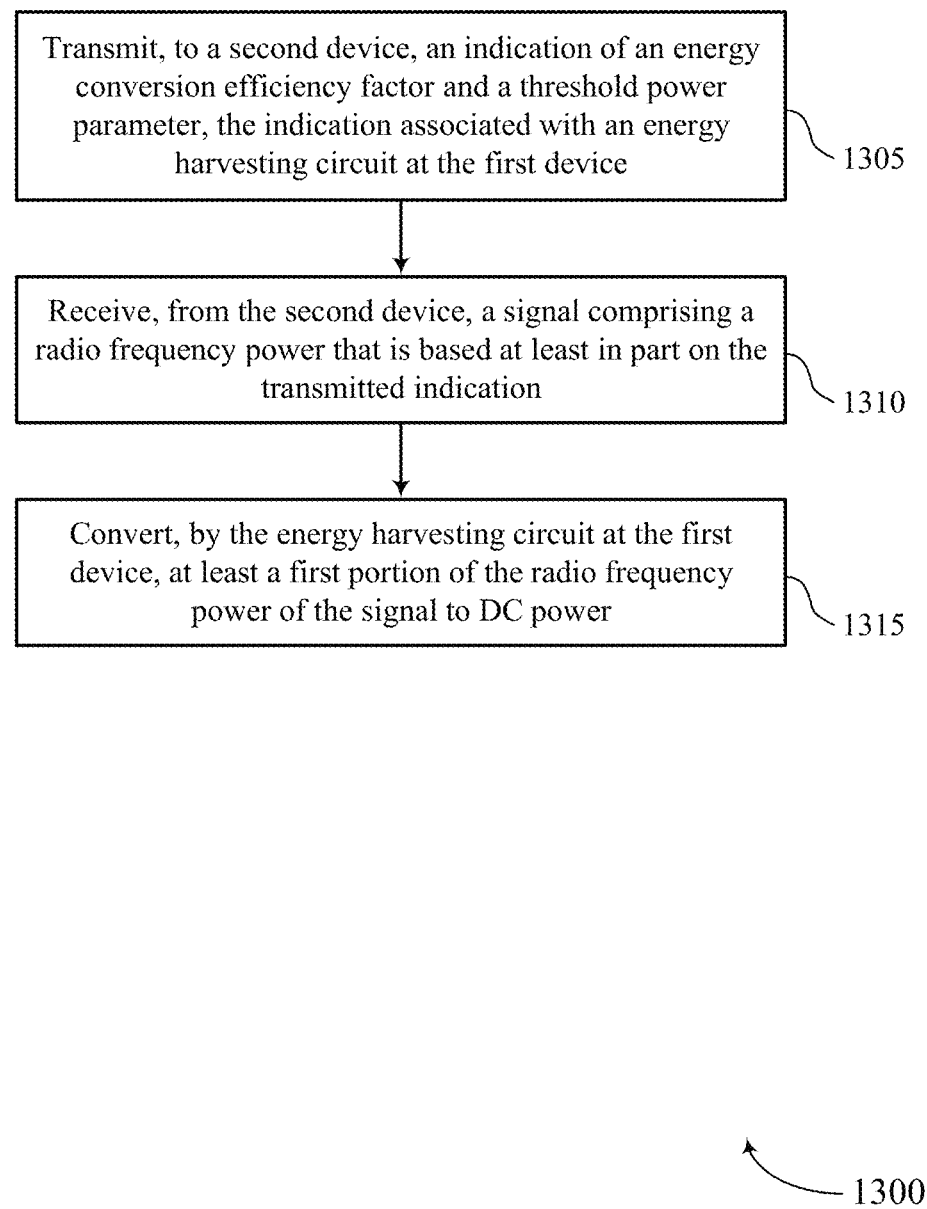
FIGS. 13 through 17 show flowcharts illustrating methods that support signaling for energy harvesting at a device in accordance with one or more aspects of the present disclosure.

FIG. 13 shows a flowchart illustrating a method 1300 that supports signaling for energy harvesting at a device in accordance with one or more aspects of the present disclosure. The operations of the method 1300 may be implemented by a first device (e.g., a UE, a base station, a sidelink enabled device, or any other device) or its components as described herein. For example, the operations of the method 1300 may be performed by a first device as described with reference to FIGS. 1 through 12. In some examples, a first device may execute a set of instructions to control the functional elements of the first device to perform the described functions. Additionally or alternatively, the first device may perform aspects of the described functions using special-purpose hardware.

At 1305, the method may include transmitting, to a second device, an indication of an energy conversion efficiency factor and a threshold power parameter. The operations of 1305 may be performed in accordance with examples as disclosed herein. In some examples, aspects of the operations of 1305 may be performed by an indication transmitter 1125 as described with reference to FIG. 11.

At 1310, the method may include receiving, from the second device, a signal including a radio frequency power, where the radio frequency power is based on the transmitted indication. The operations of 1310 may be performed in accordance with examples as disclosed herein. In some examples, aspects of the operations of 1310 may be performed by a signal receiver 1130 as described with reference to FIG. 11.

At 1315, the method may include converting at least a first portion of the radio frequency power of the signal to DC power. The operations of 1315 may be performed in accordance with examples as disclosed herein. In some examples, aspects of the operations of 1315 may be performed by a radio frequency power converter 1135 as described with reference to FIG. 11.

Figure 14:
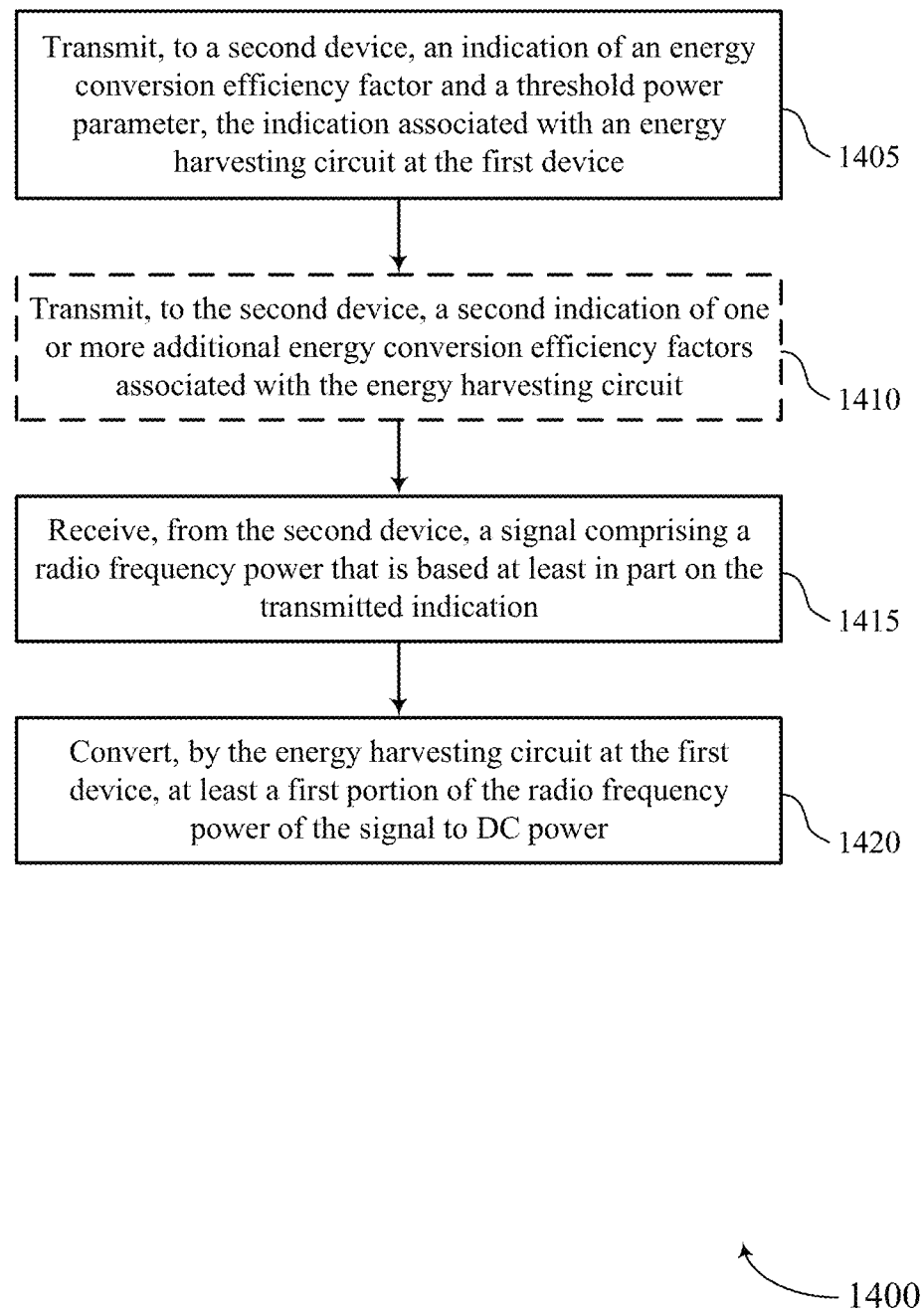

FIG. 14 shows a flowchart illustrating a method 1400 that supports signaling for energy harvesting at a device in accordance with one or more aspects of the present disclosure. The operations of the method 1400 may be implemented by a first device (e.g., a UE, a base station, a sidelink enabled device, or any other device) or its components as described herein. For example, the operations of the method 1400 may be performed by a first device as described with reference to FIGS. 1 through 12. In some examples, a first device may execute a set of instructions to control the functional elements of the first device to perform the described functions. Additionally or alternatively, the first device may perform aspects of the described functions using special-purpose hardware.

At 1405, the method may include transmitting, to a second device, an indication of an energy conversion efficiency factor and a threshold power parameter. The operations of 1405 may be performed in accordance with examples as disclosed herein. In some examples, aspects of the operations of 1405 may be performed by an indication transmitter 1125 as described with reference to FIG. 11.

At 1410, the method may include transmitting, to the second device, a second indication of one or more additional energy conversion efficiency factors. The operations of 1410 may be performed in accordance with examples as disclosed herein. In some examples, aspects of the operations of 1410 may be performed by an indication transmitter 1125 as described with reference to FIG. 11.

At 1415, the method may include receiving, from the second device, a signal including a radio frequency power, where the radio frequency power is based on the transmitted indication. The operations of 1415 may be performed in accordance with examples as disclosed herein. In some examples, aspects of the operations of 1415 may be performed by a signal receiver 1130 as described with reference to FIG. 11.

At 1420, the method may include converting at least a first portion of the radio frequency power of the signal to DC power. The operations of 1420 may be performed in accordance with examples as disclosed herein. In some examples, aspects of the operations of 1420 may be performed by a radio frequency power converter 1135 as described with reference to FIG. 11.

Figure 15:
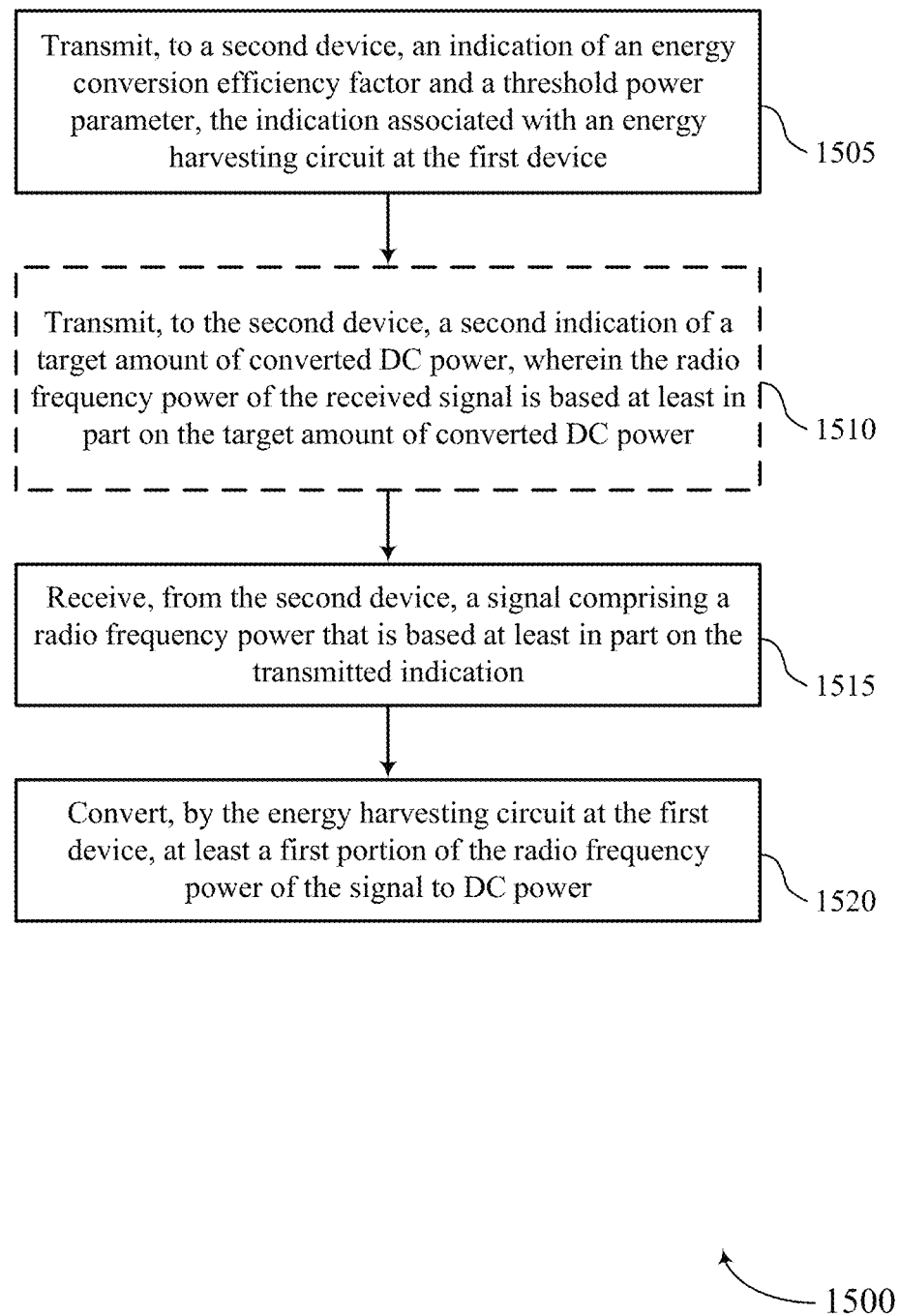

FIG. 15 shows a flowchart illustrating a method 1500 that supports signaling for energy harvesting at a device in accordance with one or more aspects of the present disclosure. The operations of the method 1500 may be implemented by a first device or its components as described herein. For example, the operations of the method 1500 may be performed by a first device as described with reference to FIGS. 1 through 12. In some examples, a first device may execute a set of instructions to control the functional elements of the first device to perform the described functions. Additionally or alternatively, the first device may perform aspects of the described functions using special-purpose hardware.

At 1505, the method may include transmitting, to a second device, an indication of an energy conversion efficiency factor and a threshold power parameter. The operations of 1505 may be performed in accordance with examples as disclosed herein. In some examples, aspects of the operations of 1505 may be performed by an indication transmitter 1125 as described with reference to FIG. 11.

At 1510, the method may include transmitting, to the second device, a second indication of a target amount of converted DC power, where the radio frequency power of the received signal is further based on the target amount of converted DC power. The operations of 1510 may be performed in accordance with examples as disclosed herein. In some examples, aspects of the operations of 1510 may be performed by an indication transmitter 1125 as described with reference to FIG. 11.

At 1515, the method may include receiving, from the second device, a signal including a radio frequency power, where the radio frequency power is based on the transmitted indication. The operations of 1515 may be performed in accordance with examples as disclosed herein. In some examples, aspects of the operations of 1515 may be performed by a signal receiver 1130 as described with reference to FIG. 11.

At 1520, the method may include converting at least a first portion of the radio frequency power of the signal to DC power. The operations of 1520 may be performed in accordance with examples as disclosed herein. In some examples, aspects of the operations of 1520 may be performed by a radio frequency power converter 1135 as described with reference to FIG. 11.

Figure 16:
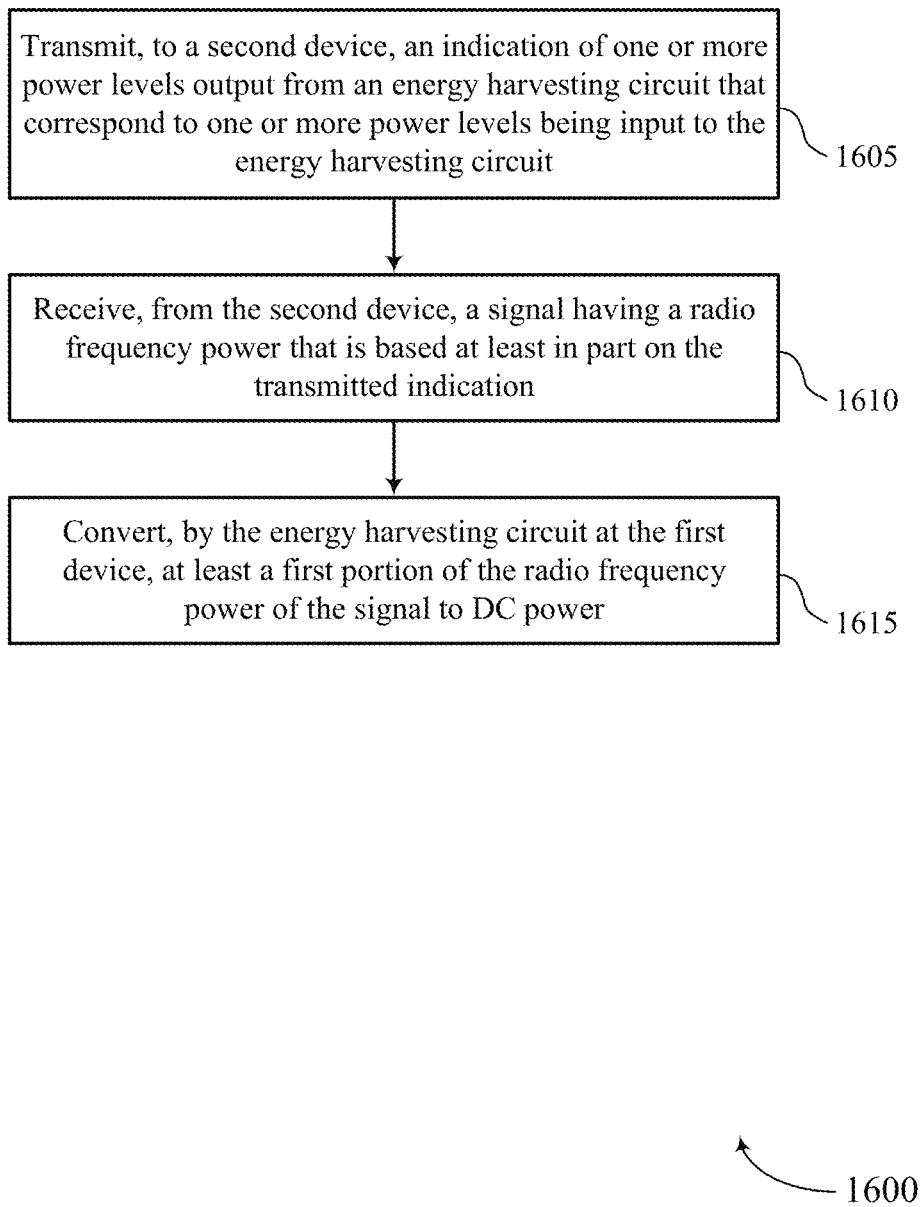

FIG. 16 shows a flowchart illustrating a method 1600 that supports signaling for energy harvesting at a device in accordance with one or more aspects of the present disclosure. The operations of the method 1600 may be implemented by a first device (e.g., a UE, a base station, a sidelink enabled device, or any other device) or its components as described herein. For example, the operations of the method 1600 may be performed by a first device as described with reference to FIGS. 1 through 12. In some examples, a first device may execute a set of instructions to control the functional elements of the first device to perform the described functions. Additionally or alternatively, the first device may perform aspects of the described functions using special-purpose hardware.

At 1605, the method may include transmitting, to a second device, an indication of a set of power levels including a first quantity of input radio frequency power levels and a second quantity of output DC power levels. The operations of 1605 may be performed in accordance with examples as disclosed herein. In some examples, aspects of the operations of 1605 may be performed by an indication transmitter 1125 as described with reference to FIG. 11.

At 1610, the method may include receiving, from the second device, a signal having a radio frequency power that is based on the transmitted indication. The operations of 1610 may be performed in accordance with examples as disclosed herein. In some examples, aspects of the operations of 1610 may be performed by a signal receiver 1130 as described with reference to FIG. 11.

At 1615, the method may include converting at least a first portion of the radio frequency power of the signal to DC power. The operations of 1615 may be performed in accordance with examples as disclosed herein. In some examples, aspects of the operations of 1615 may be performed by a radio frequency power converter 1135 as described with reference to FIG. 11.

Figure 17:
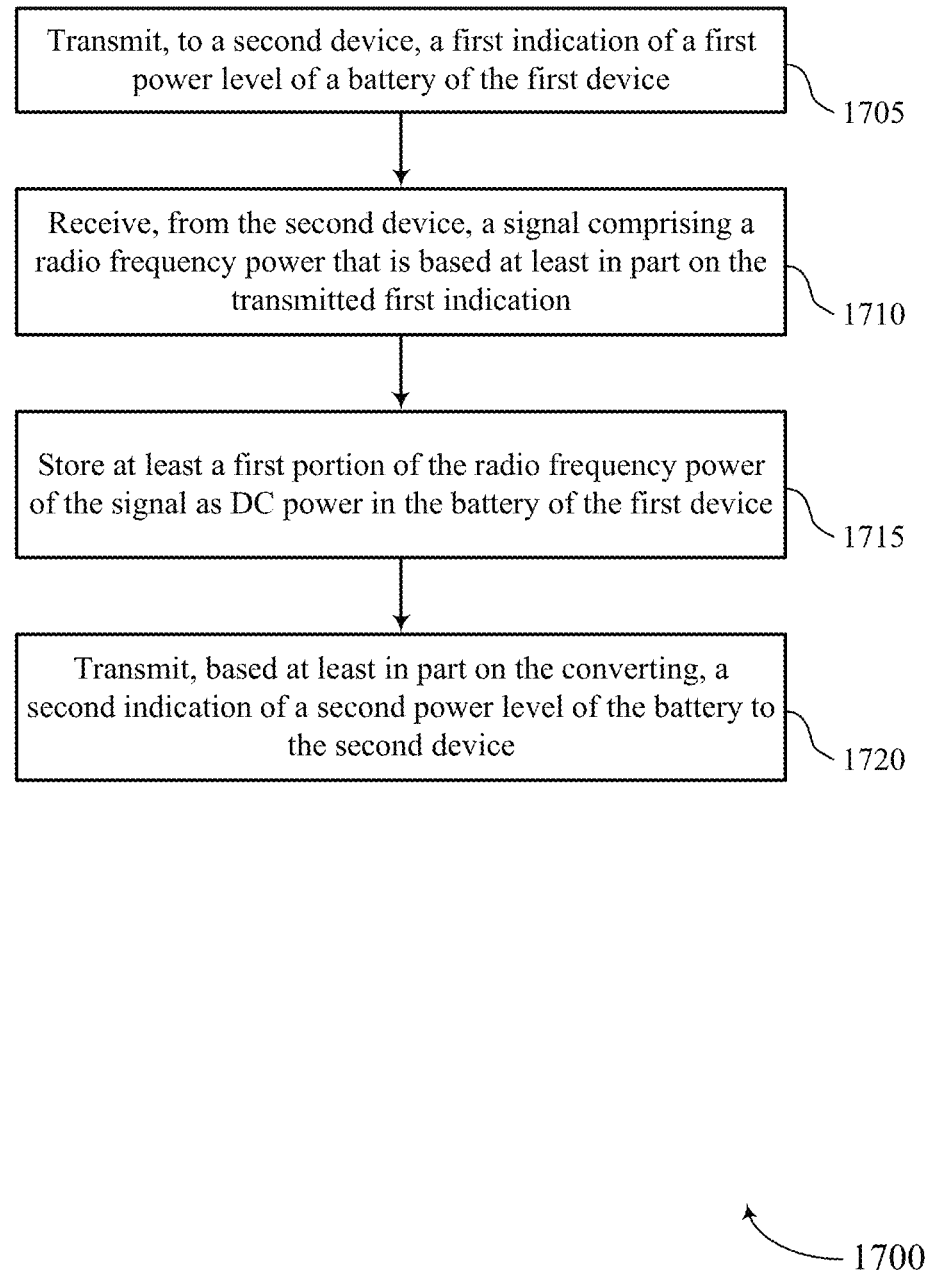

FIG. 17 shows a flowchart illustrating a method 1700 that supports signaling for energy harvesting at a device in accordance with one or more aspects of the present disclosure. The operations of the method 1700 may be implemented by a first device (e.g., a UE, a base station, a sidelink enabled device, or any other device) or its components as described herein. For example, the operations of the method 1700 may be performed by a first device as described with reference to FIGS. 1 through 12. In some examples, a first device may execute a set of instructions to control the functional elements of the first device to perform the described functions. Additionally or alternatively, the first device may perform aspects of the described functions using special-purpose hardware.

At 1705, the method may include transmitting, to a second device, a first indication of a first power level of a battery of the first device. The operations of 1705 may be performed in accordance with examples as disclosed herein. In some examples, aspects of the operations of 1705 may be performed by an indication transmitter 1125 as described with reference to FIG. 11.

At 1710, the method may include receiving, from the second device, a signal including a radio frequency power, where the radio frequency power is based on the transmitted first indication. The operations of 1710 may be performed in accordance with examples as disclosed herein. In some examples, aspects of the operations of 1710 may be performed by a signal receiver 1130 as described with reference to FIG. 11.

At 1715, the method may include storing at least a first portion of the radio frequency power of the signal as DC power at the first device. The operations of 1715 may be performed in accordance with examples as disclosed herein. In some examples, aspects of the operations of 1715 may be performed by a DC power storage component 1140 as described with reference to FIG. 11.

At 1720, the method may include transmitting, based on the storing, a second indication of a second power level of the battery to the second device. The operations of 1720 may be performed in accordance with examples as disclosed herein. In some examples, aspects of the operations of 1720 may be performed by an indication transmitter 1125 as described with reference to FIG. 11.

The following provides an overview of aspects of the present disclosure:

Aspect 1: A method for wireless communication at a first device, comprising: transmitting, to a second device, an indication of an energy conversion efficiency factor and a threshold power parameter; receiving, from the second device, a signal comprising a radio frequency power, wherein the radio frequency power is based at least in part on the transmitted indication; and converting at least a first portion of the radio frequency power of the signal to direct current power.

Aspect 2: The method of aspect 1, further comprising: transmitting, to the second device, a second indication of one or more additional energy conversion efficiency factors.

Aspect 3: The method of aspect 2, further comprising: determining, by the first device, a model associated with an efficiency of energy harvesting, wherein the energy conversion efficiency factor and the one or more additional energy conversion efficiency factors are based at least in part on the model.

Aspect 4: The method of any of aspects 1 through 3, further comprising: transmitting, to the second device, a second indication of a target amount of converted direct current power, wherein the radio frequency power of the received signal is further based at least in part on the target amount of converted direct current power.

Aspect 5: The method of aspect 4, the transmitting the second indication comprising: transmitting the second indication via a media access control-control element, a transmission via a physical uplink channel, or a combination thereof.

Aspect 6: The method of any of aspects 1 through 5, the transmitting the indication of the energy conversion efficiency factor and the threshold power parameter comprising: transmitting the indication via radio resource control signaling, a media access control-control element, control information, or a combination thereof.

Aspect 7: The method of any of aspects 1 through 6, further comprising: storing the direct current power at the first device based at least in part on the converting.

Aspect 8: The method of any of aspects 1 through 7, further comprising: decoding the signal based at least in part on a second portion of the radio frequency power of the signal.

Aspect 9: A method for wireless communication at a first device, comprising: transmitting, to a second device, an indication of a set of power levels comprising a first quantity of input radio frequency power levels and a second quantity of output direct current power levels; receiving, from the second device, a signal having a radio frequency power that is based at least in part on the transmitted indication; and converting at least a first portion of the radio frequency power of the signal to direct current power.

Aspect 10: The method of aspect 9, the transmitting the indication comprising: transmitting a mapping between the first quantity of input radio frequency power levels and the second quantity of output direct current power levels.

Aspect 11: The method of any of aspects 9 through 10, further comprising: determining, for each of the first quantity of input radio frequency power levels, a corresponding one of the second quantity of output direct current power levels, wherein transmitting the indication is based at least in part on the determining.

Aspect 12: The method of any of aspects 9 through 11, further comprising: transmitting, to the second device, a second indication of a target amount of converted direct current power, wherein the radio frequency power of the received signal is based at least in part on the target amount of converted direct current power.

Aspect 13: The method of aspect 12, the transmitting the second indication comprising: transmitting the second indication via a media access control-control element, a transmission via a physical uplink channel, or a combination thereof.

Aspect 14: The method of any of aspects 9 through 13, the transmitting the indication comprising: transmitting the indication via radio resource control signaling, a media access control-control element, control information, or a combination thereof.

Aspect 15: The method of any of aspects 9 through 14, further comprising: storing the direct current power at the first device based at least in part on the converting.

Aspect 16: The method of any of aspects 9 through 15, further comprising: decoding the signal based at least in part on a second portion of the radio frequency power of the signal.

Aspect 17: A method for wireless communication at a first device, comprising: transmitting, to a second device, a first indication of a first power level of a battery of the first device; receiving, from the second device, a signal comprising a radio frequency power, wherein the radio frequency power is based at least in part on the transmitted first indication; storing at least a first portion of the radio frequency power of the signal as direct current power at the first device; and transmitting, based at least in part on the converting, a second indication of a second power level of the battery to the second device.

Aspect 18: The method of aspect 17, further comprising: receiving, from the second device, a request for the second indication of the second power level of the battery, wherein transmitting the second indication is based at least in part on receiving the request for the second indication from the second device.

Aspect 19: The method of any of aspects 17 through 18, further comprising: transmitting, to the second device, a third indication of a type of the battery of the first device, wherein receiving the signal is based at least in part on transmitting the third indication of the type of the battery of the first device.

Aspect 20: The method of any of aspects 17 through 19, further comprising: transmitting, to the second device, a third indication of a target amount of converted direct current power, wherein the radio frequency power of the received signal is based at least in part on the target amount of converted direct current power.

Aspect 21: The method of aspect 20, the transmitting the second indication comprising: transmitting the second indication via a media access control-control element, a transmission via a physical uplink channel, or a combination thereof.

Aspect 22: The method of any of aspects 17 through 21, further comprising: receiving, from the second device, a second signal comprising a second radio frequency power that is based at least in part on the second power level of the battery, wherein receiving the second signal is based at least in part on transmitting the second indication.

Aspect 23: The method of any of aspects 17 through 22, further comprising: converting at least the first portion of the radio frequency power of the signal to the direct current power, wherein the storing is based at least in part on the converting.

Aspect 24: An apparatus for wireless communication at a first device, comprising a processor; memory coupled to the processor; the processor and memory configured to perform a method of any of aspects 1 through 8.

Aspect 25: An apparatus for wireless communication at a first device, comprising at least one means for performing a method of any of aspects 1 through 8.

Aspect 26: A non-transitory computer-readable medium storing code for wireless communication at a first device, the code comprising instructions executable by a processor to perform a method of any of aspects 1 through 8.

Aspect 27: An apparatus for wireless communication at a first device, comprising a processor; memory coupled to the processor; the processor and memory configured to perform a method of any of aspects 9 through 16.

Aspect 28: An apparatus for wireless communication at a first device, comprising at least one means for performing a method of any of aspects 9 through 16.

Aspect 29: A non-transitory computer-readable medium storing code for wireless communication at a first device, the code comprising instructions executable by a processor to perform a method of any of aspects 9 through 16.

Aspect 30: An apparatus for wireless communication at a first device, comprising a processor; memory coupled to the processor; the processor and memory configured to perform a method of any of aspects 17 through 23.

Aspect 31: An apparatus for wireless communication at a first device, comprising at least one means for performing a method of any of aspects 17 through 23.

Aspect 32: A non-transitory computer-readable medium storing code for wireless communication at a first device, the code comprising instructions executable by a processor to perform a method of any of aspects 17 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a wireless device, comprising:
   one or more memories; and
   one or more processors coupled with the one or more memories and, configured to cause the wireless device to:
      transmit a first indication of an energy conversion efficiency factor;
      transmit a second indication of a target amount of direct current power for generation by the wireless device; and
      receive a signal comprising a radio frequency power that is based at least in part on the energy conversion efficiency factor and the target amount of direct current power.

2. The apparatus of claim 1, further comprising:
   an energy harvesting circuit, coupled with the one or more processors and the one or more memories, configured to convert at least a first portion of the radio frequency power of the signal to direct current power according to the energy conversion efficiency factor.

3. The apparatus of claim 2, wherein, to transmit the first indication of the energy conversion efficiency factor, the one or more processors are configured to cause the wireless device to:
   transmit the first indication comprising a threshold power parameter, the energy harvesting circuit configured to convert at least the first portion of the radio frequency power to the direct current power based at least in part on the threshold power parameter.

4. The apparatus of claim 3, wherein the first portion of the radio frequency power corresponds to the threshold power parameter.

5. The apparatus of claim 1, wherein the one or more processors are further configured to cause the wireless device to:
transmit a third indication of one or more additional energy conversion efficiency factors.

6. The apparatus of claim 5, wherein the one or more processors are further configured to cause the wireless device to:
determine a model associated with an efficiency of energy harvesting, wherein the energy conversion efficiency factor and the one or more additional energy conversion efficiency factors are based at least in part on the model.

7. The apparatus of claim 1, wherein, to transmit the first indication of the energy conversion efficiency factor, the one or more processors are configured to cause the wireless device to:
transmit radio resource control signaling, a media access control-control element, uplink control information, or a combination thereof.

8. The apparatus of claim 1, further comprising:
a signal decoding circuit, coupled with the one or more processors and the one or more memories, configured to decode the signal based at least in part on a second portion of the radio frequency power of the signal.

9. A method for wireless communication by a wireless device, comprising:
transmitting a first indication of an energy conversion efficiency factor;
transmitting a second indication of a target amount of direct current power for generation by the wireless device; and
receiving a signal comprising a radio frequency power that is based at least in part on transmission of the energy conversion efficiency factor and the target amount of direct current power.

10. The method of claim 9, further comprising:
converting at least a first portion of the radio frequency power of the signal to direct current power according to the energy conversion efficiency factor.

11. The method of claim 10, the transmitting of the first indication of the energy conversion efficiency factor comprising:
transmitting the first indication comprising a threshold power parameter, conversion of at least the first portion of the radio frequency power to the direct current power based at least in part on the threshold power parameter.

12. The method of claim 11, wherein the first portion of the radio frequency power corresponds to the threshold power parameter.

13. The method of claim 9, further comprising:
transmitting a third indication of one or more additional energy conversion efficiency factors.

14. The method of claim 13, further comprising:
determining a model associated with an efficiency of energy harvesting, wherein the energy conversion efficiency factor and the one or more additional energy conversion efficiency factors are based at least in part on the model.

15. The method of claim 9, the transmitting of the first indication of the energy conversion efficiency factor comprising:
transmitting radio resource control signaling, a media access control-control element, uplink control information, or a combination thereof.

16. The method of claim 9, further comprising:
decoding, by a signal decoding circuit, the signal based at least in part on a second portion of the radio frequency power of the signal.

17. A non-transitory computer-readable medium storing code for wireless communication at a wireless device, the code comprising instructions executable by one or more processors to cause the wireless device to:
transmit a first indication of an energy conversion efficiency factor;
transmit a second indication of a target amount of direct current power for generation by the wireless device; and
receive a signal comprising a radio frequency power that is based at least in part on transmission of the energy conversion efficiency factor and the target amount of direct current power.

18. The non-transitory computer-readable medium of claim 17, wherein the instructions are further executable by the one or more processors to cause the wireless device to:
convert, by an energy harvesting circuit of the wireless device, at least a first portion of the radio frequency power of the signal to direct current power according to the energy conversion efficiency factor.

* * * * *